(12) United States Patent
Zang et al.

(10) Patent No.: US 10,628,671 B2
(45) Date of Patent: Apr. 21, 2020

(54) ROAD MODELING FROM OVERHEAD IMAGERY

(71) Applicant: HERE Global B.V., Eindhoven (NL)

(72) Inventors: Andi Zang, Evanston, IL (US); Zichen Li, Evanston, IL (US)

(73) Assignee: HERE Global B.V., Eindhoven (NL)

( * ) Notice: Subject to any disclaimer, the term of this patent is extended or adjusted under 35 U.S.C. 154(b) by 135 days.

(21) Appl. No.: 15/800,945

(22) Filed: Nov. 1, 2017

(65) Prior Publication Data

US 2019/0130182 A1    May 2, 2019

(51) Int. Cl.
*G06K 9/00* (2006.01)
*G06K 9/46* (2006.01)
*G03B 15/00* (2006.01)

(52) U.S. Cl.
CPC ....... *G06K 9/00651* (2013.01); *G03B 15/006* (2013.01); *G06K 9/469* (2013.01); *G06K 9/00798* (2013.01); *G06T 2207/10016* (2013.01); *G06T 2207/30256* (2013.01)

(58) Field of Classification Search
CPC .... G06F 3/011; G06F 3/0304; G06F 16/2264; G06F 16/9024; G06F 3/0346; A63F 13/213; A63F 13/24; A63F 13/426; A63F 13/428; A63F 13/655; A63F 13/00; G06T 7/73; G06K 9/00771; G06K 9/6202; G06K 9/00221; G06K 9/00335; G06K 9/00369; G06K 9/627; G06K 9/00718; G06K 9/6256; G06K 9/62; G06N 3/04; G06N 3/08; G06N 3/02; H04N 7/181; H04N 5/2226; G08C 17/02; G08B 13/196
See application file for complete search history.

(56) References Cited

U.S. PATENT DOCUMENTS

| | | | |
|---|---|---|---|
| 7,359,555 B2 | 4/2008 | Porikli et al. | |
| 9,077,958 B2 | 7/2015 | Gupta et al. | |
| 9,262,853 B2 | 2/2016 | Mitchell et al. | |
| 9,547,805 B1 | 1/2017 | Erignac | |
| 2016/0180177 A1* | 6/2016 | Nguyen ............ | G06K 9/00798 382/104 |
| 2017/0116477 A1 | 4/2017 | Chen et al. | |

OTHER PUBLICATIONS

Aharon Bar Hillel, Ronen Lerner, Dan Levi, and Guy Raz. 2014. Recent progress in road and lane detection: a survey. Machine vision and applications 25, 3 (2014), 727-745.

Alberto Broggi et al: "Vision-Based Road Detection in Automotive Systems: A Real-Time Expectation-Driven Approach" pp. 325-348, 1995.

(Continued)

*Primary Examiner* — Duy M Dang
(74) *Attorney, Agent, or Firm* — Lempia Summerfield Katz LLC

(57) ABSTRACT

Apparatus and methods are described for roadway lane line detection. An aerial image including a plurality of pixels is received and provides to a classification model. The classification model provides probability values assigned to at least a portion of the plurality of pixels. A comparison of the probability values is performed to select at least one pixel according to the comparison. A lane line object is identified for the selected at least one pixel.

17 Claims, 20 Drawing Sheets

(56) References Cited

OTHER PUBLICATIONS

Andi Zang, Xin Chen, and Goce Trajcevski. 2017. High-Definition Digital Elevation Model System (Vision Paper). In Proceedings of International Conference on Scientific and Statistical Database Management. ACM.
Andreas Geiger et al: "Are we ready for Autonomous Driving?The KITTI Vision Benchmark Suite", pp. 1-8, Jun. 16, 2012.
Andreas Schindler, Georg Maier, and Florian Janda. 2012. Generation of high precision digital maps using circular arc splines. In Intelligent Vehicles Symposium (IV), 2012 IEEE. IEEE, 246-251.
António Ferraz et al: "Large-scale road detection in forestedmountainous areas using airborne topographiclidar data" pp. 23-36, Oct. 15, 2016.
Bing. 2012. Bing Maps Tile System. (2012). https://msdn.microsoft.com/en-us/library/bb259689.aspx, pp. 1-11.
Bisheng Yang, Lina Fang, and Jonathan Li. 2013. Semi-automated extraction and delineation of 3D roads of street scene from mobile laser scanning point clouds. ISPRS Journal of Photogrammetry and Remote Sensing 79 (2013), 80-93.
Brent Schwarz. 2010. LIDAR: Mapping the world in 3D. Nature Photonics 4, 7 (2010), 429.
Brody Huval et al. "An Empirical Evaluation of Deep Learning onHighway Driving" pp. 1-7, Apr. 17, 2015.
Brody Huval, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, and others. 2015. An empirical evaluation of deep learning on highway driving. arXiv preprint arXiv:1504.01716 (2015).
D. Chaudhuri et al: "Semi-Automated Road Detection FromHigh Resolution Satellite Images by Directional Morphological Enhancement and Segmentation Techniques" IEEE journal of selected topics in applied earth observations and remote sensing 5, 5 (2012), 1538-1544.
David Freedman. 2017. 10 Breakthrough Technologies. MIT Technology Review, https://www.technologyreview.com/lists/technologies/2017/.
David Wilkie et al: "Transforming GIS Data into Functional RoadModels for Large-Scale Traffic Simulation" pp. 1-14, Oct. 2010.
Dragos Costea and Marius Leordeanu. 2016. Aerial image geolocalization from recognition and matching of roads and intersections. arXiv preprint arXiv:1605.08323, pp. 1-6 (2016).
Dragos Costea et al: "Aerial image geolocalization from recognition andmatching of roads and intersections" pp. 1-6, May 26, 2016.
Federal Highway Administration. 2013. Highway Statistics 2013. (2013). https://www.fhwa.dot.gov/policyinformation/statistics/2013/hm220.cfm.
Florian Schüle et al: "Feature Evaluation of Factorized Self-Localization" pp. 451-457, Oct. 2014.
Gellert Mattyus, Shenlong Wang, Sanja Fidler, and Raquel Urtasun. 2015. Enhancing Road Maps by Parsing Aerial Images Around the World. In Proceedings of the IEEE International Conference on Computer Vision. pp. 1689-1697.
Gellért Máttyus, Shenlong Wang, Sanja Fidler, and Raquel Urtasun. 2016. HD Maps: Fine-grained Road Segmentation by Parsing Ground and Aerial Images. In Proceedings of the IEEE Conference on Computer Vision and Pattern Recognition. pp. 3611-3619.
Gerardo Atanacio-Jiménez, José-Joel González-Barbosa, Juan B Hurtado-Ramos, Francisco J Ornelas-Rodríguez, Hugo Jiménez-Hernández, Teresa García-Ramirez, and Ricardo González-Barbosa. 2011. LIDAR velodyne HDL-64E calibration using pattern planes. International Journal of Advanced Robotic Systems 8, 5 (2011), 59.
Geremy Heitz and Daphne Koller. 2008. Learning spatial context: Using stuff to find things. In European conference on computer vision. Springer, pp. 30-43.
H. Zhou et al: "Fast Road Detection and Tracking in Aerial Videos" pp. 712-718, Jun. 2014.
Hailing Zhou et al: "Efficient Road Detection and Trackingfor Unmanned Aerial Vehicle" pp. 1-14, Feb. 2015.
Heiko G. Seif et al: "Autonomous Driving in the iCity—HD Maps as a Key Challenge of the Automotive Industry" pp. 1-4, Jun. 23, 2016.
Helmut Mayer et al: "A Test of Automatic Road Extraction Approaches" pp. 1-6, 2006.
HERE. 2015. HERE introduces HD maps for highly automated vehicle testing. (2015). http://360.here.com/2015/07/20/here-introduces-hd-maps-for-highly-automated-vehicle-testing/.
J. Zoesch and T.J. Zoesch. 2014. New Guidelines for the Geometric Design of Rural Roads in Germany. (2014).
Janette Zoesch et al. "The new Guidelines for the Geometric Design of Rural Roads and the transfer into the existing Road Network in Germany" University of Technology Dresden, Nov. 4, 2014, pp. 1-11.
Jiuxiang Hu, Anshuman Razdan, John C Femiani, Ming Cui, and Peter Wonka. 2007. Road network extraction and intersection detection from aerial images by tracking road footprints. IEEE Transactions on Geoscience and Remote Sensing 45, 12 (2007), 4144-4157.
Joel Pazhayampallil and Kai Yuan Kuan. Deep Learning Lane Detection for Autonomous Vehicle Localization. (2013). pp. 1-5, Dec. 13, 2013.
John C Trinder and Yandong Wang. 1998. Automatic road extraction from aerial images. Digital Signal Processing 8, 4 (1998), 215-224.
Liang-Chieh Chen, George Papandreou, Iasonas Kokkinos, Kevin Murphy, and Alan L Yuille. 2016. Deeplab: Semantic image segmentation with deep convolutional nets, atrous convolution, and fully connected crfs. arXiv preprint arXiv:1606.00915 (2016).
Mehdi Mokhtarzade and MJ Valadan Zoej. 2007. Road detection from highresolution satellite images using artificial neural networks. International journal of applied earth observation and geoinformation 9, 1 (2007), 32-40.
Norman Mattern et al: "High-accurate vehicle localization using digital maps and coherency images" pp. 462-469, Jun. 2010.
Oliver Pink and Christoph Stiller. 2010. Automated map generation from aerial images for precise vehicle localization. In Intelligent Transportation Systems (ITSC), 2010 13th International IEEE Conference on. IEEE, 1517-1522.
Pedro Pinheiro and Ronan Collobert. 2014. Recurrent convolutional neural networks for scene labeling. In International Conference on Machine Learning. 82-90.
R.Gecen et al: "Road Detection from High and Low Resolution Satellite Images" pp. 355-358, 2008.
Renaud P'eteri et al: "Detection and Extration of Road Networks From High Resolution Satellite Images" pp. 1-4, 2003.
Ruzena Bajcsy and Mohamad Tavakoli. 1976. Computer recognition of roads from satellite pictures. IEEE Transactions on Systems, Man, and Cybernetics 9 (1976), 623-637.
Sebastian Bittel, Vitali Kaiser, Marvin Teichmann, and Martin Thoma. 2015. Pixel-wise segmentation of street with neural networks. arXiv preprint arXiv:1511.00513 (2015).
Tao Tang et al.; "A Lane Detection Method for Freeway AerialVideos" 8th International Congress on Image and Signal Processing, pp. 1-6, Oct. 2016.
TMTpost. 2016. Baidu Driverless Cars Run in Wuzhen, Powered ByFour Leading Technologies. (2016). https://medium.com/@TMTpost/baidu-driverless-cars-run-in-wuzhen-poweredby-four-leading-technologiesn discretionaryf-gfgfg-tmtpost-53c0b3072cec.
Tsung-Yi Lin et al: "Cross-View Image Geolocalization" pp. 1-8, Jul. 6, 2016.
Umat Cinar; "Road Extraction From High Resolution Satellite Images Using Adaptive Boosting with Multi-resolution Analysis" pp. 1-144, Sep. 2012.
Vicini et al.; "Road Extraction From Aerial Images" pp. 1-4, Jul. 2016.
Volodymyr Mnih and Geoffrey E Hinton. 2010. Learning to detect roads in highresolution aerial images. In European Conference on Computer Vision. Springer, 210-223.
Xiaodong Gu, Andi Zang, Xinyu Huang, Alade Tokuta, and Xin Chen. "Fusion of color images and LiDAR data for lane classification.

(56) References Cited

OTHER PUBLICATIONS

" In Proceedings of the 23rd SIGSPATIAL International Conference on Advances in Geographic Information Systems. ACM pp. 1-4, Nov. 3, 2015.
Young-woo Seo et al: "Ortho-Image Analysis for Producing Lane-Level Highway Maps" pp. 506-509, Sep. 2012.
Young-Woo Seo, Chris Urmson, and David Wettergreen. 2012. Ortho-image analysis for producing lane-level highway maps. In Proceedings of the 20th International Conference on Advances in Geographic Information Systems. ACM, 506-509.
Young-Woo Seo. 2012. Augmenting cartographic resources and assessing roadway state for vehicle navigation. Carnegie Mellon University.
Gellert Mattyus, Shenlong Wang, Sanja Fidler, and Raquel Urtasun. 2015. Enhancing Road Maps by Parsing Aerial Images Around the World. In Proceedings of the IEEE International Conference on Computer Vision. 1689-1697.
Gellért Máttyus, Shenlong Wang, Sanja Fidler, and Raquel Urtasun. 2016. HD Maps: Fine-grained Road Segmentation by Parsing Ground and Aerial Images. In Proceedings of the IEEE Conference on Computer Vision and Pattern Recognition. 3611-3619.
Geremy Heitz and Daphne Koller. 2008. Learning spatial context: Using stuff to find things. In European conference on computer vision. Springer, 30-43.
Renaud Péteri et al: "Detection and Extraction of Road Networks From High Resolution Satellite Images" pp. 1-4, 2003.

\* cited by examiner

ROAD MODELING FROM OVERHEAD IMAGERY

FIELD

The following disclosure relates to road modeling from overhead imagery, or more particularly, lane line modeling from overhead imagery in combination with lane candidate grouping and/or a lane marking probability map.

BACKGROUND

Map databases may be used to provide navigation based features such as routing instructions for an optimum route from an original location to a destination location and map based features such as section and display of maps to manually locate locations or points of interest. Map databases are used in driver assistance systems such as autonomous driving systems.

Terrestrial views are images collected from the ground or near the ground, such as from a vehicle. The terrestrial views may be analyzed to determine road attributes and/or road objects, which are used for creating or updating maps or map database. Terrestrial views suffer from a major drawback. The terrestrial views often include occlusions. Occlusions may occur, for example when the terrestrials are collected by a moving vehicle, when another vehicle is traveling nearby and blocks the line of sight between the collection vehicle and the road attributes or road objects.

SUMMARY

In an embodiment, a method for roadway lane line detection includes receiving an aerial image including a plurality of pixels, providing, by a processor, at least a portion of the aerial image to a classification model, receiving, from the classification model, probability values assigned to at least a portion of the plurality of pixels, performing, by the processor, a comparison of the probability values, selecting, by the processor, at least one pixel according to the comparison; and determining, by the processor, a lane line for the selected at least one pixel.

In another embodiment, an apparatus for roadway lane line detection includes at least a memory and a classification device. The memory is configured to store an aerial image including a plurality of pixels. The classification device is configured to analyze at least a portion of the aerial image and calculate probability values assigned to at least a portion of the plurality of pixels. A lane line is defined according to the probability values.

In another embodiment, a method includes detecting a geographic position of a mobile device, querying a geographic database using the geographic position, and receiving, from the geographic database, a lane line object for a roadway. The lane line is based on a comparison of probability values assigned to pixels of an aerial image from a classification model.

In another embodiment, an apparatus includes position circuitry and a geographic database. The position circuitry is configured to detect a geographic position of a mobile device. The geographic database configured to provide, in response to the geographic position, a lane line for a roadway, and the lane line is based on a comparison of probability values assigned to pixels of an aerial image from a classification model.

BRIEF DESCRIPTION OF THE DRAWINGS

Exemplary embodiments of the present invention are described herein with reference to the following drawings.

DETAILED DESCRIPTION

High definition (HD) maps are highly accurate maps. HD maps may include locations data in three dimensions with a spatial resolution of at least a threshold distance to pixel ratio. Example threshold distance ratios include 30 centimeters per pixel (i.e., each pixel in the image for the HD map represents 30 centimeters in the three-dimensional space), 20 centimeters per pixel, or other values. The HD maps may be defined according to the Open Lane Model of the Navigation Data Standard (NDS).

The HD maps and the spatial resolution are configured for automated driving. The HD maps may include road borders and lane borders based on lane line definitions. Such lane-level maps augment vehicle sensor information for contextual analysis of the environment, assist the vehicle in executing controlled maneuvers beyond its sensing range, and provide precise vehicle positioning and orientation in map coordinates. These maps work in conjunction with localization objects such as signs, barriers, poles, and surface markings to provide the vehicle a comprehensive and accurate knowledge of the environment. One of the most important attributes in lane-level maps is the geometry of the lane boundaries. High level road networks (i.e., interstate, expressways, and freeways), as compared to low level road networks (i.e., principal/minor arterial and local roads), have higher quality constructions, clearer traffic condition, and consume higher logistics and transportation labor cost, and accordingly are the first stage to apply autonomous driving techniques.

Because there are millions of kilometers of roads in the world, it is cost-prohibitive and time-consuming to manually create and maintain such lane information at a centimeter-level precision. The lengths of three largest highway networks in the world, U.S., China, and India, are 103, 446, and 79 thousand kilometers, respectively. Considering current reported HD Maps manual modeling efficiency, it takes years to mapping the entire high level road networks even with thousands of workers and high costs to maintain the data, which directs efforts to high level road networks.

A vehicle may be equipped with one or more environment sensors (e.g., a camera sensor array, light detection and ranging (LiDAR)) configured to detect surroundings of the vehicle, and more specifically, detect one or more objects such as lane markings on the roadway surface and in the vicinity of the vehicle. The accuracy and effectiveness of the environment sensors on the vehicle are highly susceptible to obstacles that cause occlusions between the environmental sensors and the surroundings. For example, other traffic (i.e., vehicles traveling nearby) may block the environment sensors from detecting road objects. In particular, there may be occlusions that block the detect of lane markings or other road objects.

Figure 1:
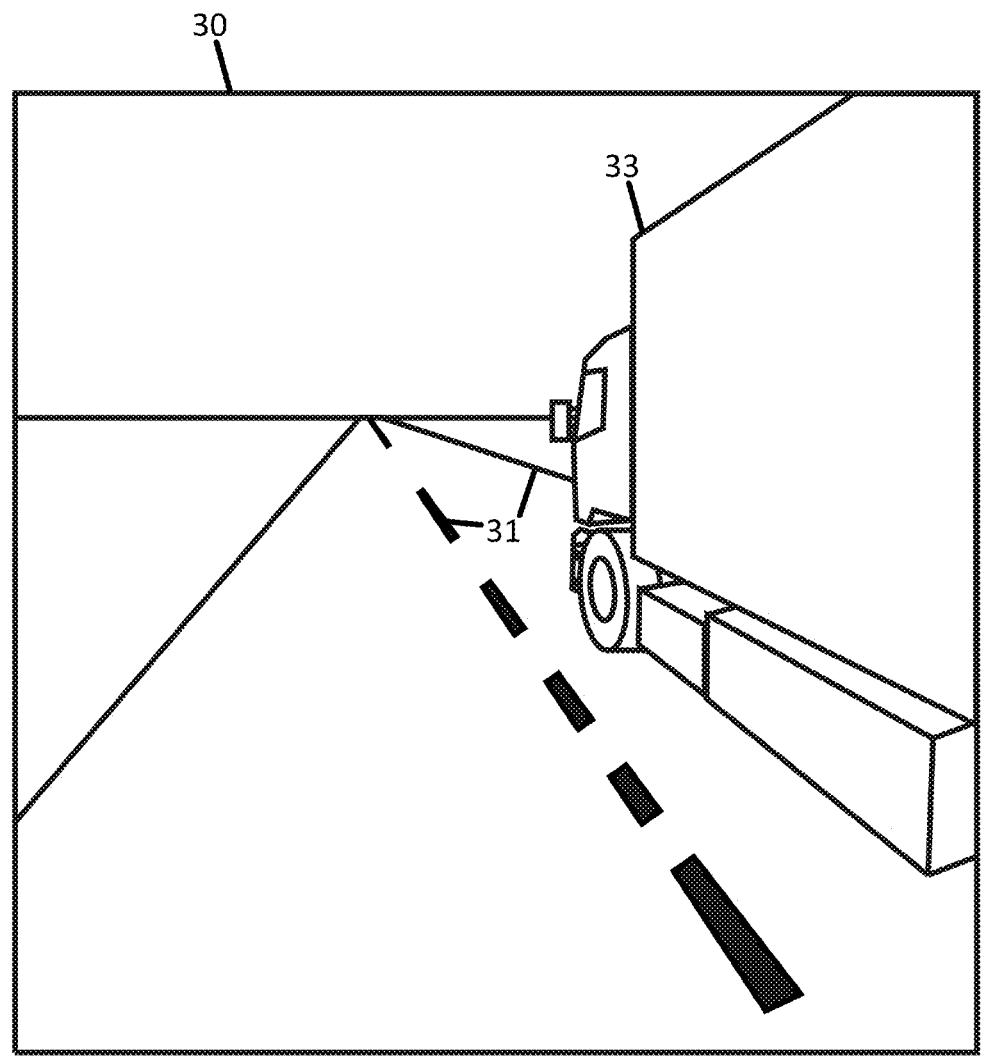
FIG. 1 illustrates an example occlusion from perspective imagery.

Occlusion is one of the biggest challenges of road and lane extraction in either LIDAR point clouds and ground-level imagery. FIG. 1 illustrates an example perspective image 30 including lane markings 31 blocked by truck 33. At any point in time, the truck 33 may block the data acquisition vehicle from detection of lane marking and other objects. In addition, when the truck 33 drives alongside the data acquisition vehicle at a similar speed, a wall effect is generated in the middle of the road. This scenario is unavoidable at all locations on road networks, which leads to an empty region behind the wall and makes road model creation more difficult. In addition to traffic occlusions, other problems with these types of detections from the perspective of the vehicle include prohibitive cost, infrequent update, and incomplete coverage.

The following embodiments perform road modeling including the detection of lane markings and other road objects from overhead imagery. The following embodiments automatically extract lane boundary from overhead imagery using pixel-wise segmentation and machine learning, and convert unstructured lines into structured road model by using hypothesis linking algorithm. The first stage, pixel-wise line segmentation, performs patch-based lane-marking classification. Then for each positive patch, the line candidates are determined from the line pixels. The second stage, the hypothesis linking algorithm, connects line candidates by minimizing a cost function to generate a structured lane model. This technique overcomes the traffic occlusions and other aforementioned problems.

Problems with lane marking detection systems using LiDAR are overcome. The LiDAR only systems are highly susceptible to calibration errors in the LiDAR intensities. When the LiDAR intensity is not well calibrated (or simply high intensity points are mostly coming from grass or other extraneous objects and not from lane painting lines), then the lane marking detection from LiDAR is often incorrect. In the following embodiments, image-based detection does not rely on LiDAR intensity calibration. Thus, when the LiDAR intensity is badly calibrated, the following embodiments still produce good results for lane marking geometry generation.

In addition, LiDAR only systems are negatively affected by traffic occlusions (e.g., a vehicle physically located between the collection device and the lane marking when the LiDAR data is collected). When there is a traffic occlusion, the LiDAR only detector may detect lane line or road boundary on the edge of occlusion instead, resulting in inaccurate detections. In the following embodiments, deep-learning based detectors do not suffer, or at least suffer much less, from errors from lane line occlusions. Thus, the precision of detection is always very high and few wrong detections are made.

Because the following embodiments perform all aspects of the localization and/or map updates automatically, both computer and human resources are conserved. Human resources are conserved because there is no requirement of human intervention in identification of the lane marking. Conventional techniques require a massive amount of manual labeling work in high definition map building, especially localizing the lane/road boundaries in limited access roads. The disclosed embodiments include an improvement to the computer technology of map building because the process of calculating the geometry of the lane line object, and accordingly localization or map updated based on the lane markings, is more efficient.

Figure 2A:
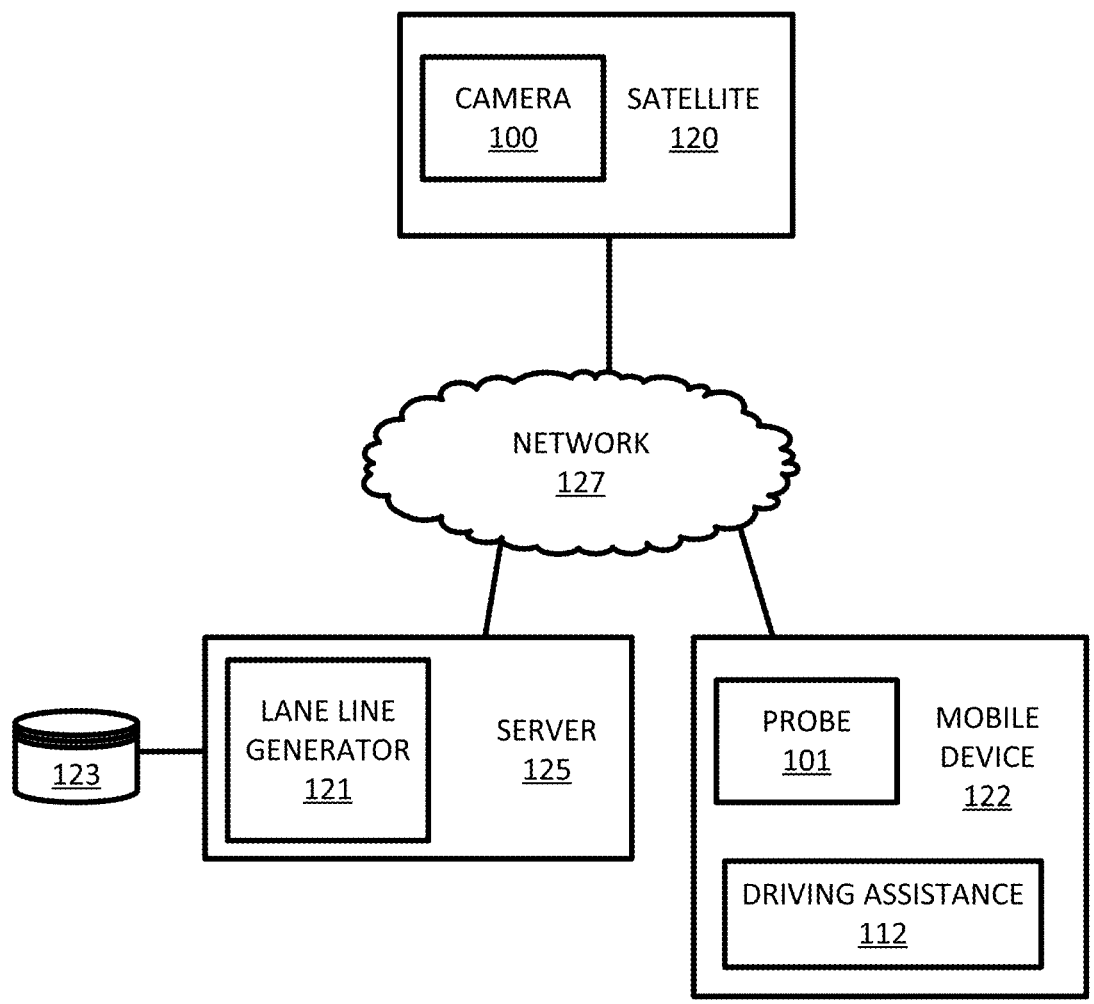
FIG. 2A illustrates an example system for road modeling from overhead imagery.

FIG. 2A illustrates an example system for road modeling from overhead imagery. In FIG. 2A, a satellite 120 includes a camera 100. The satellite 120 communicates through the network 127 to a server 125 including a lane line generator 121. Optionally, a mobile device 122 including a probe 101 may also communicate through the network 127, or a different network, to the server 125. Optionally, the one or more mobile devices 122 may include a driving assistance device 112. The driving assistance device 112 and the mobile device 122 may be embodied by a single device (e.g., a vehicle navigation system) or the driving assistance device 122 may be separate from the mobile device 122. A database 123, including the map, is also connected to the server 125. The database 123 and the server 125 make up a developer system. Multiple mobile devices 122 may be connected to the server 125 through the network 127. Additional, different, or fewer components may be included.

The satellite 120 collects overhead imagery. The satellite 120 may be substituted by other aerial vehicles such as an airplane, spaceship, helicopter, drone, or other device. Overhead imagery includes any type of imaging not collected at the vehicle. A subset of overhead imagery is aerial imagery. Aerial imagery may be collected from an aerial vehicle such as an airplane, a helicopter, or a drone. The aerial image may be collected from an orbiting device such as a satellite. Images collected by a satellite may be referred to as satellite imagery. In any of these examples, the aerial vehicle or satellite may include a camera or a charge coupled device (CCD).

The camera may be configured from long distance photography to collect the overhead imagery. The camera may include a focal length that defines the degree of detail that can be detected by the camera. Example focal lengths and aperture sizes for the camera to achieve a spatial resolution sufficient for the recognition of the lane line marking. The distance from the camera to the road surface (e.g., the altitude of the aerial vehicle) may be defined as a function of the focal length such that the distance to the road surface. For example, a scale number (S) is the ratio of the altitude (A) to the focal length (F): S=A/F. As the scale number is higher, spatial resolution is lower, and details in the image are harder to see.

The satellite 120 sends the collected overhead imagery through the network 127 to the server 125. The server 125 provides at least a portion of the aerial image to a classification model. The classification model is configured to generate probability values for each of the pixels of the portion of the aerial image. The probability values describe how likely each pixel is part of lane line in the aerial image. The server 125 compares the probability values to select likely pixel candidates for lane lines. The likely pixel candidates may be those pixels with probability values at local maximum values. The likely pixel candidates may be those pixel with probability values above a threshold level. The server 125 may generate a lane line geometry (e.g., a set of vertices or pixel coordinates in the aerial image) to define the shape of the lane line. The geographic database 123 is updated based on the lane line geometry. The server 125 may identify a geographic location for the selected pixel. The high definition map or other three-dimensional model may be updated according to the geographic location of the lane marking or road object. For example, the road object may be stored as a roadway edge (e.g., solid line), or a boundary between lanes of travel (e.g., dashed line) in the same or different directions in the high definition map or other three-dimensional model.

For localization, the mobile device 122 may access the lane line geometry from the database 123 in order to calculate the location of the mobile device 122. The probe 101 may include any combination of an optical distance system such LiDAR, an image capture system such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera. The probe 101 may detect a lane marking, and optionally other road objects, which are compared with the road objects in the geographic database 123 to determine the location of the mobile device 122.

The probe 101 may generate a point cloud that includes data points that derived from distancing devices such as the LiDAR, SONAR, or RADAR devices. The point cloud may comprise three-dimensional data points including in a coordinate system such as (x, y, z) or (latitude, longitude, altitude). The point cloud may be measured in distances and angles between the object described by the points in the point cloud to the collection device. In this example, the data points may be described as (distance, angle1, angle2). The angles may be measured from a set of axes. For example, angle1 may be measured from a horizontal axis intersecting with the position of the collection device and angle1 may be measured from a vertical axis intersecting the position of the collection device.

The mobile device 122 may access the lane line geometry from the database 123 in order to provide assisted driving functions. For example, the mobile device 122 may generate and provide assisted driving messages to the driver. The assisted driving message may warn the driver than a lane line has been crossed or is at risk of being crossed. In another example, the mobile device 122 may generate and provide a driving command to the vehicle to steer, brake, or accelerate the vehicle in response to the location of the lane line.

Figure 2B:
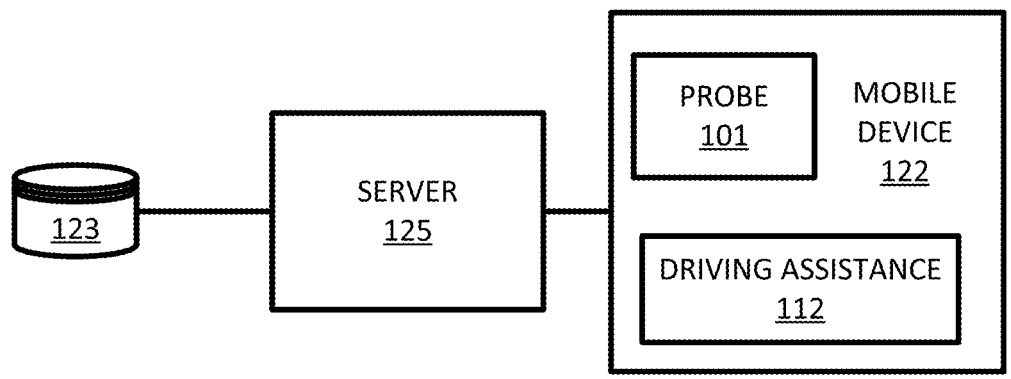
FIG. 2B illustrates another example system for road modeling from overhead imagery.

FIG. 2B illustrates another example system for road modeling from overhead imagery. The database 123 provides geographic data, which may be from the server 125 to the mobile device 122. Either the server 125 or the mobile device 122 may analyze overhead imagery to define lane markings. Either the server 125 or the mobile device 122 may include a memory configured to store an aerial image including pixels, and a classification device configured to analyze at least a portion of the aerial image and calculate probability values assigned to at least a portion of the pixels. The lane line or another road object is defined according to the probability values.

In FIG. 2B, the database 123 stores lane line markings or other road objects derived from the overhead imagery received from either the server 125 or the mobile device 122. Subsequently, other devices may access the lane marking information in the updated high definition map in order to provide driving assistance. For example, the driving assistance device 112, which may be included in a vehicle, may receive location information from probe 101 in the form of geographic coordinates. The probe 101 may be GPS or utilize another positioning device technique. The driving assistance device 112 sends the location information to the server 125 via network 127 to receive information from the high definition map including the location of the lane marking or other road object. The driving assistance device 112 provides one or more driving assistance functions to the user or vehicle in response to the location of the lane line object.

For example, the driving assistance device 112 may provide one or more driving assistance functions in the forms of messages, warnings or commands. The messages may be presented to a user describing the state of the vehicle with respect to the lane line object. For example, the message may describe the distance between the vehicle and a lane line or the distance between the projected trajectory of the vehicle and a lane line (e.g., whether the projected trajectory of the vehicle intersects a lane line). A warning may be issued to the driver or the vehicle itself. The warning may indicate that the vehicle has crossed a lane line or that the vehicle crossing a lane line is imminent. The warning may indirectly instruct the driver to turn left or right to prevent crossing the lane line. The command may directly instruct the driver to turn left or right or adjust speed to prevent crossing the lane line. The command may be a driving command that instructs the vehicle to turn left, turn right, adjust speed, or brake, in response to the position of the lane line object.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

Communication between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, or another protocol.

Figure 3:
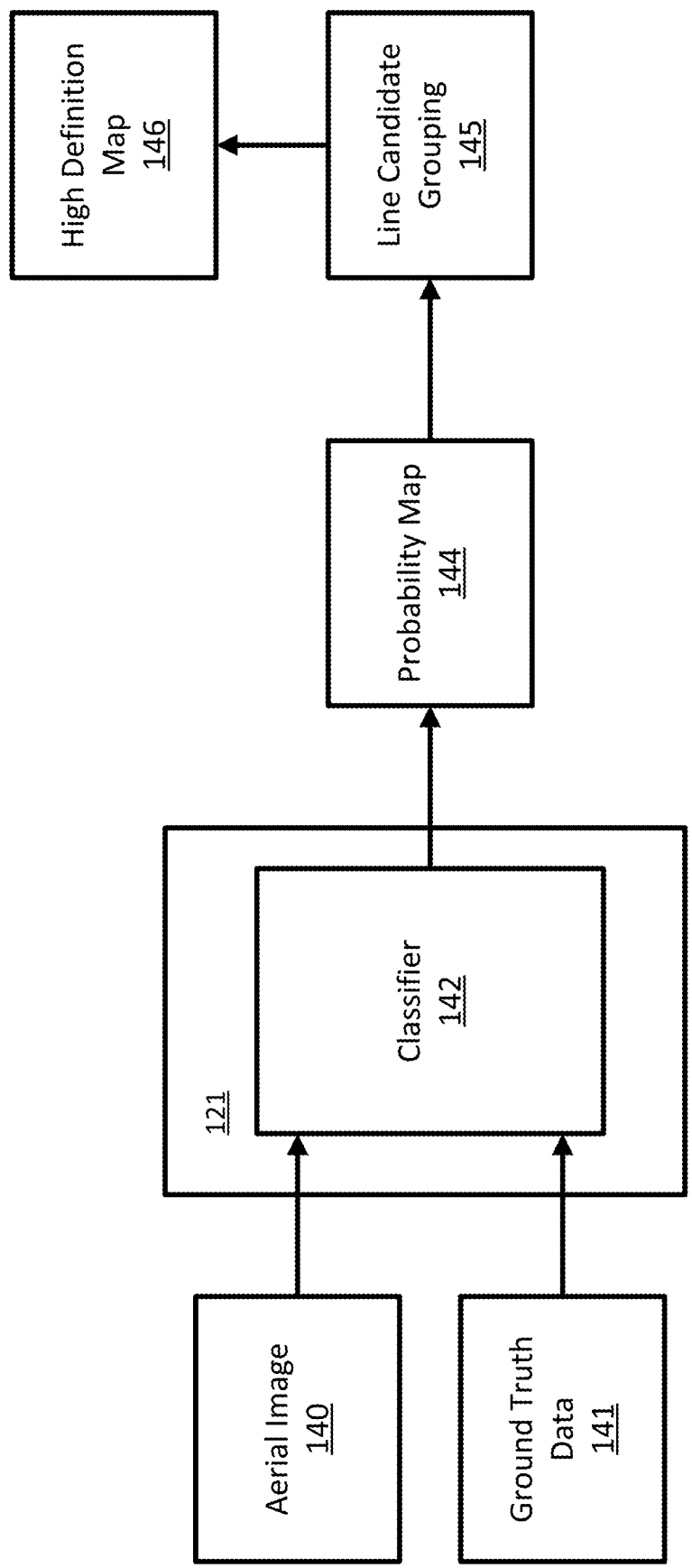
FIG. 3 illustrates an example block diagram for road modeling from overhead imagery.

FIG. 3 illustrates an example block diagram for road modeling from overhead imagery. The block diagram includes images 140 and ground truth data 141, a classifier (e.g., a deep learning model) 142, a probability map 144, a line candidate grouping 145 and a high definition map 146. The deep learning model 142 may be a component of the lane line generator 121. Additional, different, or fewer components may be included.

The images 140 may include a series of images collected at a series of times and/or a series of locations. The images 140 include overhead imagery or aerial images as described herein. The ground truth data 141 includes known locations of one or more lane markings.

Figure 4:
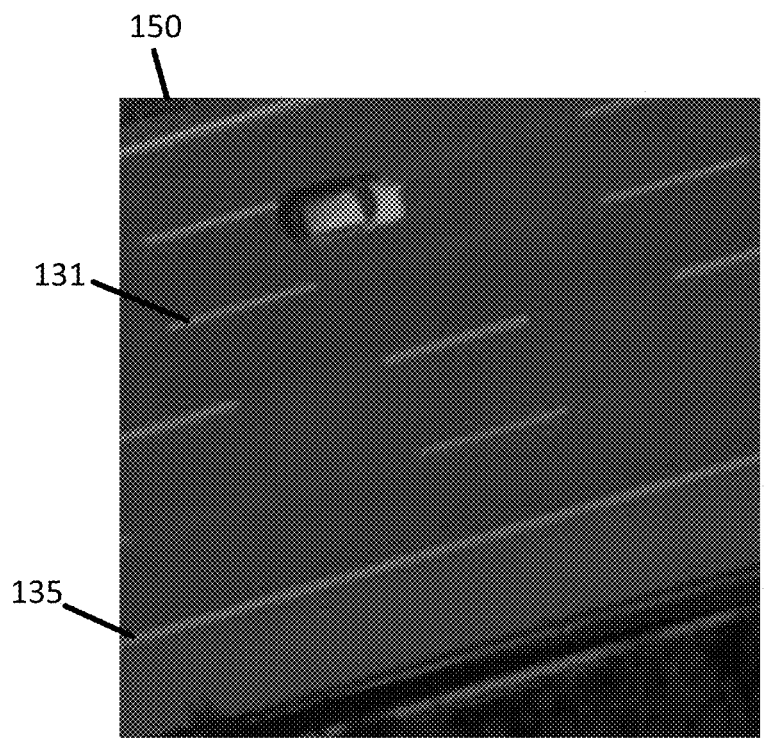
FIG. 4 illustrates example overhead images with overlaid ground truth lane markings.
Figure 4:
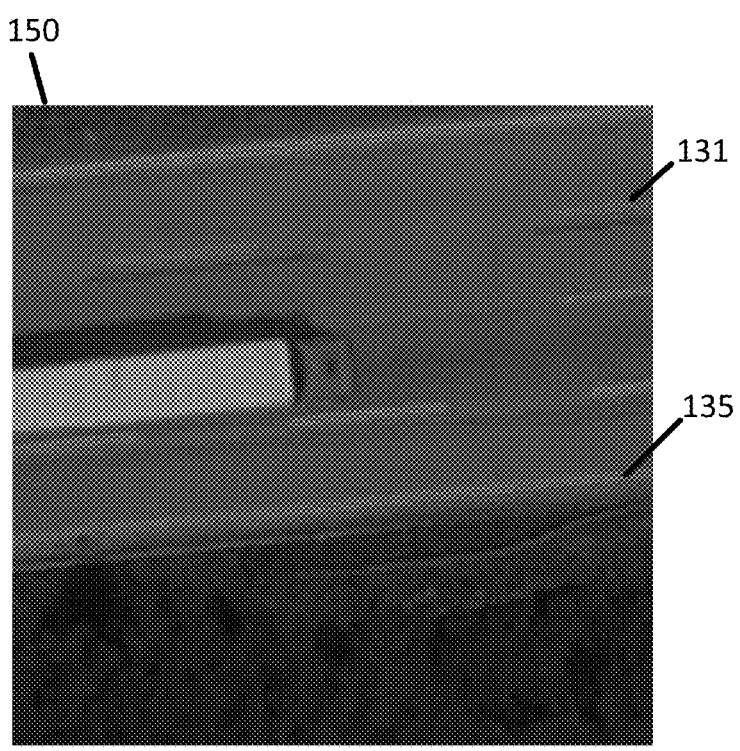

The ground truth data 141 may include training images (e.g., a subset of images 140) that have been analyzed (e.g., by human inspection) to determine the locations of lane markings in the training images. The ground truth data 141 may include a set of data that associates images using an image identifier with pixel coordinates for the locations of the lane markings. FIG. 4 illustrates example overhead images 150 with overlaid ground truth lane markings including a continuous object or solid lane line 135 or a semi-continuous object or a dash lane line 131.

The lane markings may represent a roadway edge (e.g., solid line 135), or a boundary between lanes of travel (e.g., dashed line 131) in the same or different directions in the high definition map or other three-dimensional model. The lane markings are road surface indicia, which may comprise paint applied to the road surface (i.e., paint on concrete or asphalt). The road surface indicia may be applied using decals or plastic sheets applied to the road surface with adhesive. The road surface indicia may have reflectivity or retereoflectivity properties that cause the lane markings to reflect light differently that the surrounding road surface. For example, the road surface indicia may minimize the scattering of reflected light back to the source of the light. The lane markings may include a plastic reflector or retroreflector that is secured to the road surface or mounted in concrete or asphalt to be flush with the road surface. In a retroreflector, a wave (e.g., electromagnetic wave) is reflected back to the source along a vector that is parallel to but opposite in direction from the source. As an alternative or addition to the lane markings, the ground truth data 141 may include locations of other road objects such as guardrails or barricades. A barricade, or barrier, is a temporary structure used to define a construction area or separate a portion of the roadway. A guardrail is a type of fence that runs alongside the roadway to mitigate damage in accidents (e.g., vehicles veering off the roadway).

The set of training images with ground truth location may comprise polylines. A polyline is a continuation line composed of one or more straight line segments. There are two or more endpoints or vertices in a polyline. The vertices or endpoints are the end of one segment and beginning of the next. Adjacent segments in the polyline may be in different directions. The set of training images includes a polyline based labeling format for both a continuous object (e.g., solid lane line) and a semi-continuous object (e.g., a dash lane line). The polyline based labeling defines the ground truth by human labelers.

Figure 5:
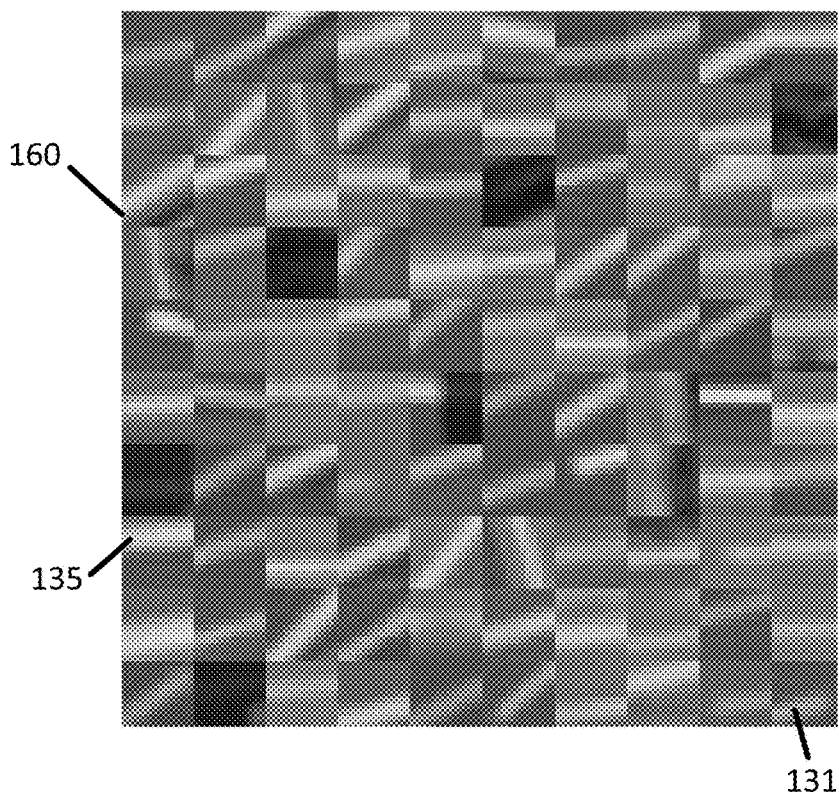
FIG. 5 illustrates test images for a classifier.
Figure 5:
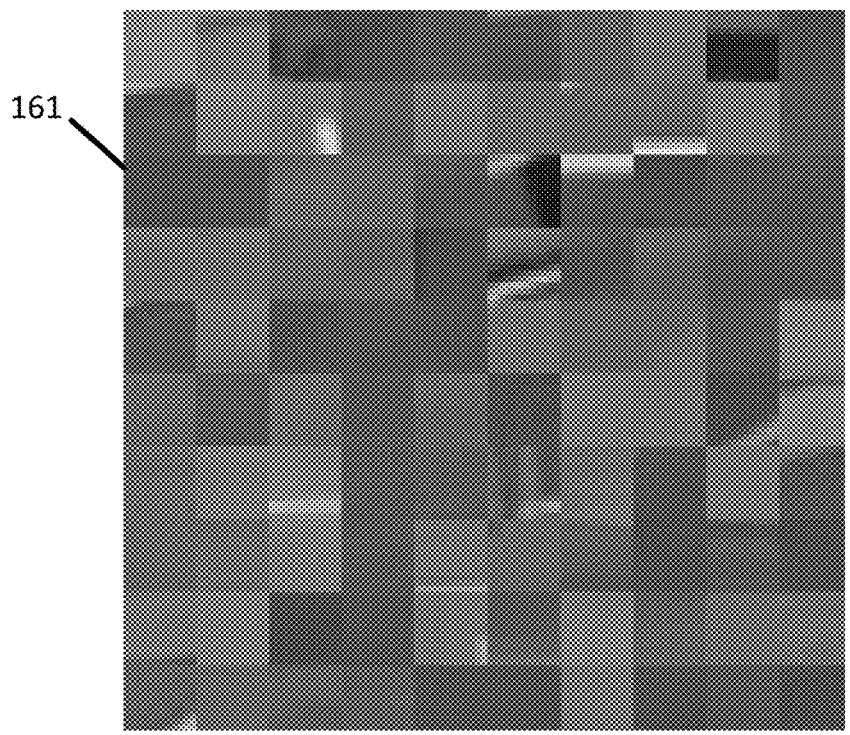

FIG. 5 illustrates test images (including positive patches 160, or lane marking image patches, and negative patches 161, or non-lane marking image patches) for the classifier 142. The test images are image samples used to train or build the classifier 142 that can determine whether an image patch contains any lane marking pixels.

While 100 positive patches 160 and 100 negative patches are shown, any number of test images may be used for training the classifier 142. The aerial images 140 and ground truth data 141, or the ground truth data 141 including images, may be cropped to generate the test images. In one example, the human labeler selects a location for a lane line (e.g., dashed line 131 or sold lane 135), and a predetermined size is cropped around the selection for defining the positive patches 160 for the test images. Similarly, the negative patches 161 for the test images may be generated at the predetermined size at locations where a lane line is not identified. Alternatively, the human labeler may select areas with no lane lines for the negative patches 161 for the test images. The negative patches 161 may include object (e.g., buildings, trucks, etc.) that are shaped in a manner similar to lane lines but should not be confused with lane lines by the classifier 142.

To reduce noise (e.g. lane markings pixel from adjacent road surfaces), the surface region may be bounded by road boundaries. That is, the images 140 are filtered according to the road boundaries in the ground truth data 141, images outside of the road boundaries are removed before defining the positive patches 160 and negative patches 161. The road boundaries may be a set distances from the center line geometry of the road segments. The positive patches 160 and negative patches 161 are selected from the portions of images within the road boundaries, which is within the road surface.

A sliding window is designed to crop training patches from corresponding satellite image within the road surface. The label for each patch is determined by whether there are any lane marking pixels in the current patch. To reduce misleading ground truth patches (e.g. the patch contains two independent lines), an appropriate window size may be thinner than a single lane width. Example appropriate window size may vary according to tile level (e.g., spatial resolution of the map). In one example, tile level 20, lane widths are approximately 3.5 meters, and the window size may be set to 3.5 meters square. With a ground resolution in tile level 20 of 0.15 meters per pixel, the patch size is 24 pixels square. Other examples, may be any geographic size for example 2 meter square, 1 meter square, or 10 feet square. Alternatively, the predetermined size may be defined by image size irrespective of ground resolution (e.g., any pixel size such as 8 pixels, 12 pixels, 16 pixels, 24 pixels, 100 pixels, or 10,000 pixels) or other shapes may be used (e.g., rectangular).

The classifier 142 receives the test images include at least one positive patch 160 associated with a positive label (e.g., data indicating that the positive patch 160 corresponds to a lane marking image) and at least one negative patch 161 (e.g., data indicating that the negative patch 161 does not correspond to a lane marking image). With cropped positive and negative samples and labels, the patch level classifier 142 is trained by using at least one machine learning technique and/or at least one machine learning device. A machine learning technique may include a Random Forest, a Support Vector Machine or a Neural Network (e.g., Artificial Neural Network (ANN) or Convolutional Neural Network (CNN)). The machine learning technique may be based on pixel representation and gradient based features such as Histogram of Oriented Gradients (HOG), or Local Binary Pattern (LBP)).

The machine learning device may be a specialized computer or processor incorporated into server 125 for performing a learned model or learned algorithm for the identification of lane markings. The classifier 142 may execute a neural network such as a convolutional neural network may include multiple layers such as at least one convolutional layer and at least one pooling layer. Other techniques for the image analysis are described in additional embodiments.

Coefficients or other parameters for the neural network are stored through training the neural network. The neural network may include multiple layers, and different coefficients may be applied to different layers. Subsequently, once the neural network has been trained, additional images may be fed to a neural network as an input. The additional images may be at different locations and/or other times than the training images.

The classifier 142 may be trained from the test images to analyze subsequent images and output a probability value for the subsequent images. The classifier 142 may output a probability map including probability values for individual pixels or portions of the image. A lane marking probability map is the sum up of all its patches at their locations. When the classifier 142 includes a neural network, the classifier 142 analyzes the image systematically through the multiple parameters assigned to the multiple layers of the neural network. The neural network may provide the probability value for each pixel of the target region or each group of pixels within the roadway boundary.

Figure 6:
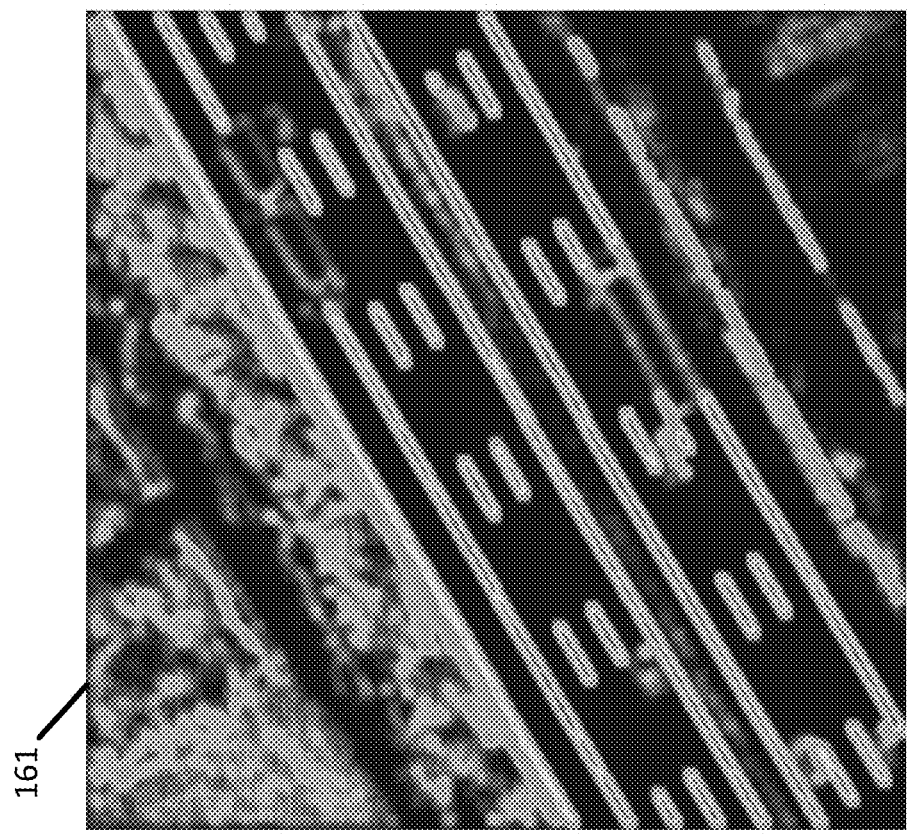
FIG. 6 illustrates an overhead image and corresponding lane marking probability map.
Figure 6:
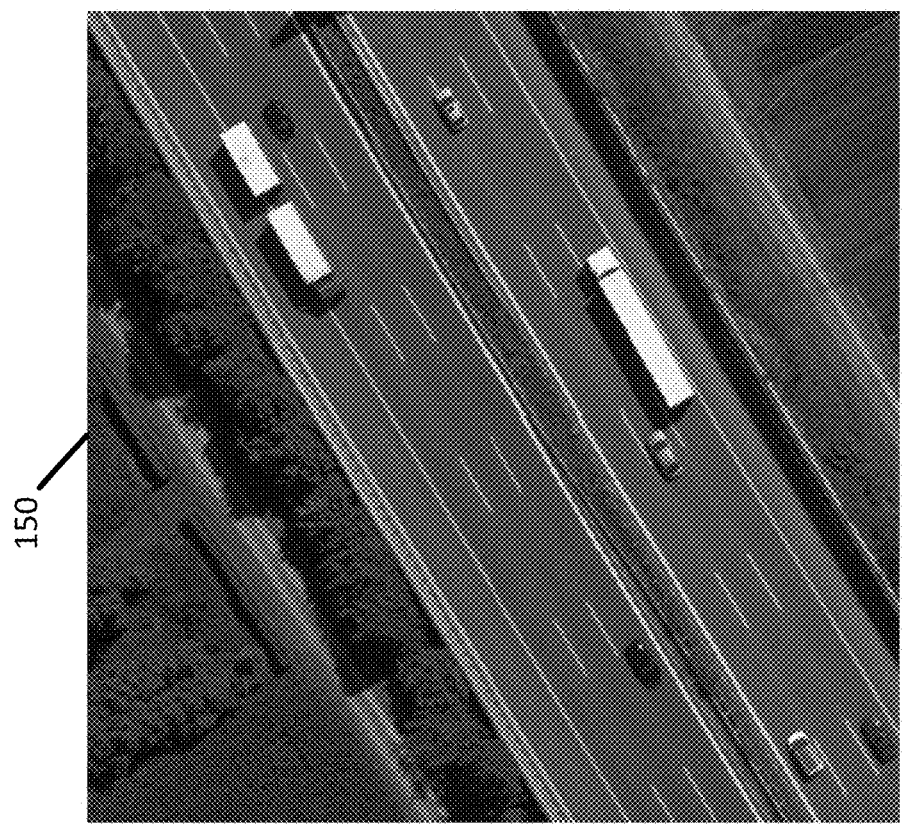

FIG. 6 illustrates an overhead image 150 and corresponding lane marking probability map 161. The trained classifier 142 analyzes the overhead image 150 and generates probability values for each pixel in the overhead image 150, or for each portion of the overhead image 150. The probability value indicates a likelihood that the pixel or portion of the overhead image 150 corresponds to a lane marking. For example, the probability value may be an integer value in a range (e.g., between 1 and 10 or 1 and 100) that indicates the chances or odds that the pixel or region corresponds to a lane marking. The probability value may be a confidence interval. The probability value may be determined by the classifier 142 depending on how confident the analysis of the classifier 142 is. For example, when the analyzed image is an exact match the probability value indicates high confidence, and when the analyzed image is determined to include a lane marking with uncertainty, the probability value indicates low confidence. As alternative to the probability value, the classifier 142 may output a single bit value (e.g., 1 for lane marking, 0 for absence of lane marking).

The probability values may be numerical values stored in a matrix in association with pixel coordinates. For example, a probability value map may include multiple cells each associated with a x-value, a y-value, and a probability value. The probability value map may be arranged in parallel to the image under analysis. The probability values may be translated to color or grayscale shades to graphically represent the probability value maps, as shown by the lane marking probability map 161 in FIG. 6. One color or shading level may be assigned to each range of probability values (e.g., shading 1 for probability value 1, shading 2 for probability value 2, and so on).

Figure 7:
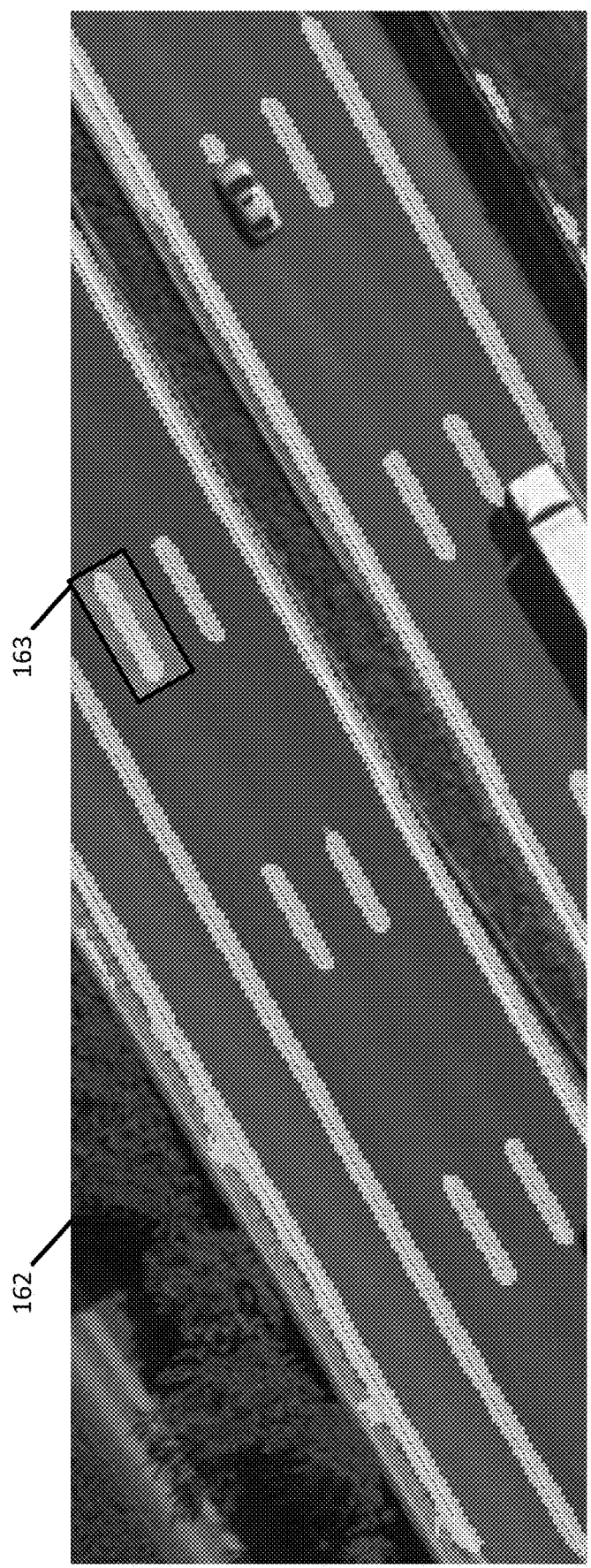
FIG. 7 illustrates lane marking region candidates.

FIG. 7 illustrates another lane marking probability map 162. An example zoomed in region 163 is illustrated in more detail in FIG. 8A. The region includes at least three levels of shading corresponding to at least three ranges of probability values. A first region 164 corresponds to a first range of possibility values, a second region 165 corresponds to a second range of possibility values, and a third region 166 corresponds to a first range of possibility values.

Figure 8B:
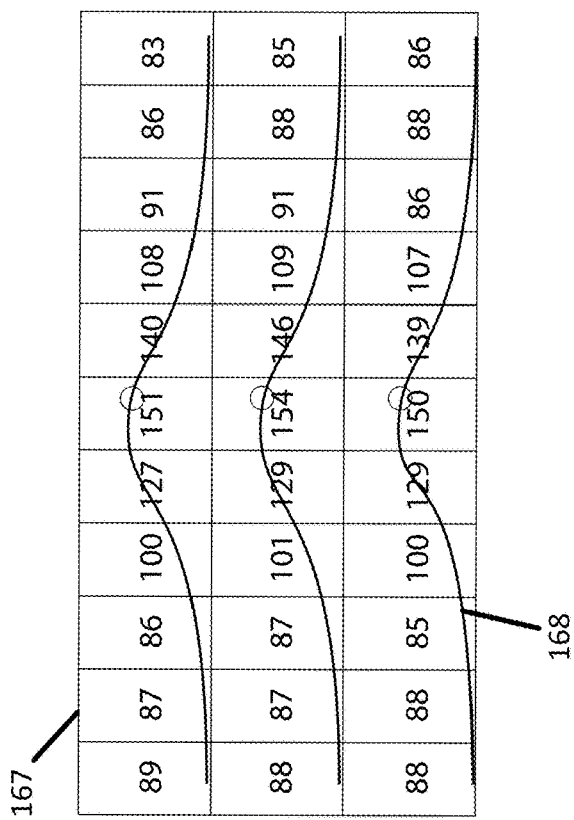
FIG. 8B illustrates a numerical lane marking probability map.
Figure 8A:
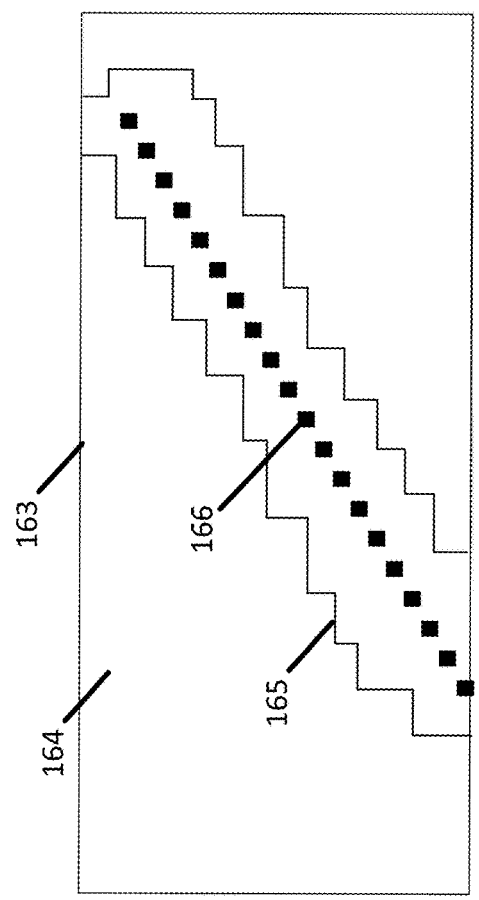
FIG. 8A illustrates a zoomed in lane marking region.

FIG. 8B illustrates a numerical lane marking probability map 167 corresponding to the graphical lane marking map 162. The classifier 142, or otherwise at the lane line generator 121, may analyze the numerical lane marking probability map 167 to identify a maximum value, or a local maximum value. Various mathematical algorithms may be used to determine the maximum value. In one example, the lane line generator 121 may determine a set of the probability values corresponding to a section of the numerical lane marking probability map 167. The set may be a horizontal line or slice, a vertical line or slice, or a diagonal line or slice extending across, partially or fully, the image under analysis. In one example, the set of probability values may extend in a direction perpendicular to the direction of the road segment. The lane line generator 121 may access the road segment trajectory from the geographic database 123 and define slices of image pixels that are arranged in a direction perpendicular to the road segment.

For example, a sequence of probability values may extend across a lane marking. The lane line generator 121 may compare the sequence of probability values to determine where the maximum value occurs. The maximum value may occur at a single pixel or a span of pixels.

The lane line generator 121 may fit a Gaussian curve at normal distribution to the sequence of probability values. The lane line generator 121 may calculate the mean and standard deviation for the sequence and probability values. The lane line generator 121 may calculate the Gaussian curve based on the mean and standard deviation.

The patch level classification produces a probability map that contains high probability lane marking regions (e.g., third region 166). However, since each region is several pixels wide (the exact size depends on patch size, step length, and the actual paint stripe width), this region may not be used to represent the lane marking in the HD maps. To segment and locate precise lane marking pixels, the pixels having the highest intensity in each slice, which are the local maximums, of lane marking region perpendicular to road trajectory as lane-marking candidate. A line segment is fit through the lane marking pixel candidates. In FIG. 8B, assuming the trajectory is up, for each row of this region, the highest intensity pixels have values of 151, 154, and 150, respectively. The lane marking is determined to be the center line (sixth column) of FIG. 8B.

Although the satellite image resolution is close to the lane marking width, the lane markings may appear blurred due to image compression, hardware imperfections (imperfect lenses, etc.), and optical limitations (i.e. angular resolution). To produce more precise lane marking pixel locations, the lane line generator 121 performs subpixel segmentation. For each slice of the lane marking region, a Gaussian model, referring again to FIG. 8B, to find the peak or maximum. The lane line generator 121 may fit a Gaussian curve at normal distribution to the sequence of probability values. The lane line generator 121 may calculate the mean and standard deviation for the sequence and probability values. The lane line generator 121 may calculate the Gaussian curve based on the mean and standard deviation. The peak of the Gaussian curve may not occur at the center of the pixels. The relative location with the pixel is a subpixel location. The subpixel designation may one of two subpixel designations (e.g., left, right), three subpixel designations, nine subpixel designations (e.g., a 3 by 3 grid), or another arrangement. Using subpixels, the resolution of the lane line designation, and accordingly the resolution of the update to the HD map, may be greater than the resolution of the aerial image.

The lane line generator 121 may designate the pixel, or multiple pixels, having the local maximum probability values as lane markings. The lane line generator 121 may apply a template shape (e.g., rectangle) to the designated pixels. In another example, the lane line generator may first designate the pixel, or multiple pixels, having the local maximum probability values as candidate lane markings. The lane line generator 121 performs an algorithm for grouping, classifying, and linking the candidate lane markings before the final lane marking determination is made.

The pixels designated as lane markings may be unstructured line segments without function label (i.e., a distinction between solid and dashed lines). Because of occlusions in the aerial images (i.e. trees, vehicles, buildings, and their shadows) and poorly painted lane markings, it is likely that there not all true lane marking lines will be detected. Conversely, more misleading lines (false positive) will be detected if lane-marking-like objects appear such as guardrails, curbs, trucks, or walls. However, it should be noted that the embodiments described herein may be modified to intentional detect any of these types of road objects.

FIGS. 9-12 illustrated a technique for transforming the unstructured lines to structured lines with function labels. The technique may include three steps: (1) grouping line candidates from each chunk, (2) classifying the function of each line group, and (3) linking to interpolate the missing lines.

Figure 9:
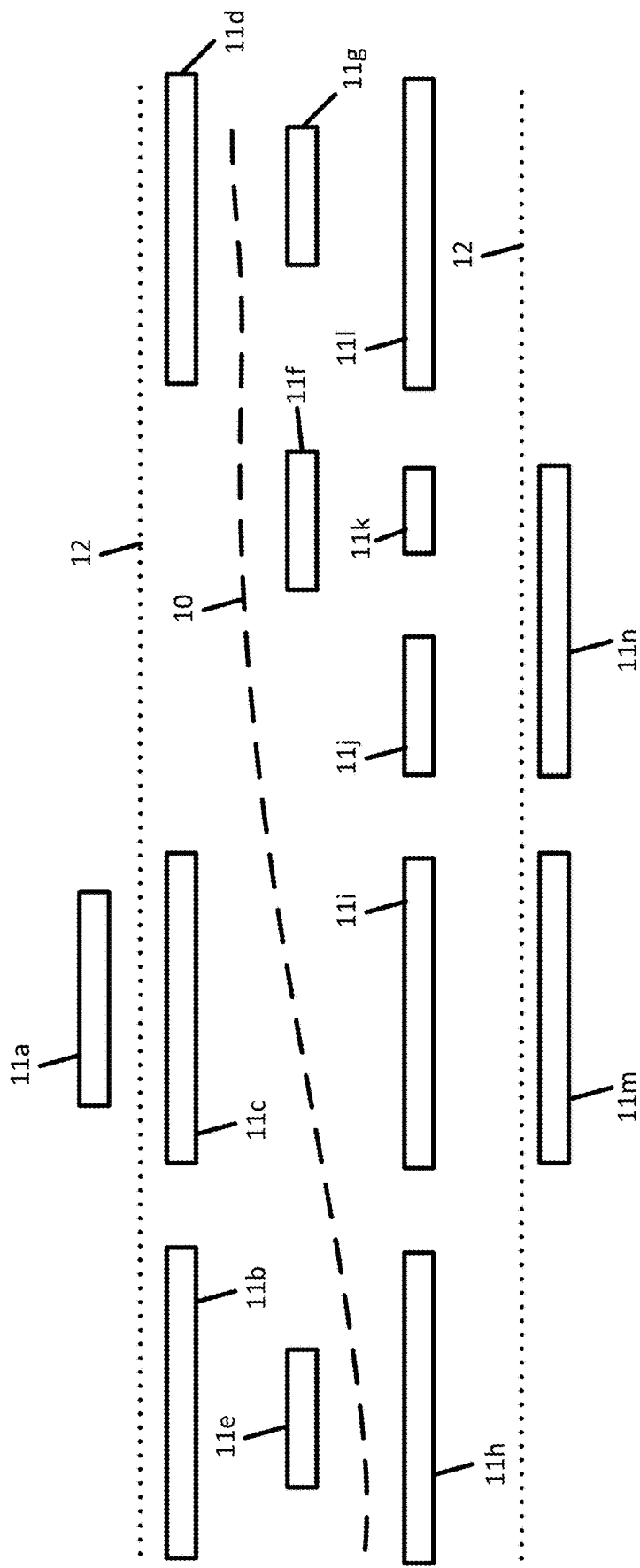
FIG. 9 illustrates lane marking candidates for a roadway.

FIG. 9 illustrates lane marking candidates 11a-11n for a roadway. The lane line generator 121 may initially group the lane marking candidates 11a-11n into one or more groups based on relative geographic position (i.e., measurement from a reference position).

Each group may include lane marking candidates near each other. The groups may be grouped based on a lateral spacing perpendicular to the direction of the road segment. The direction of the road segment may be defined by a heading associated with the road segment in the geographic database 123. The direction of the road segment may be parallel to road boundaries 12. Alternatively, the direction of the road segment may be based on the trajectory 10 of a vehicle traveling on the road segment. The trajectory 10 may be the link stored in geographic database 123 that estimates the location and direction of the road. The later spacing for defining the lane marking candidates 11a-11n may be measured from a centerline of the road segment. Lane marking candidates in a first distance range from any of these reference positions are labeled in a first group, lane marking candidates in a second distance range from any of these references positions are labeled in a second group, and so on.

In one example, the length of roadway under analysis is divided into sections in the longitudinal direction, or direction of travel, called chunks. When grouping the lane marking candidates 11a-11n, the decision to add a line into a group may depend on the relative distance from the current line to all other line candidates in the current chunk, in the neighboring chunk(s), and their relative distances to road centerline or vehicle trajectory.

Figure 10:
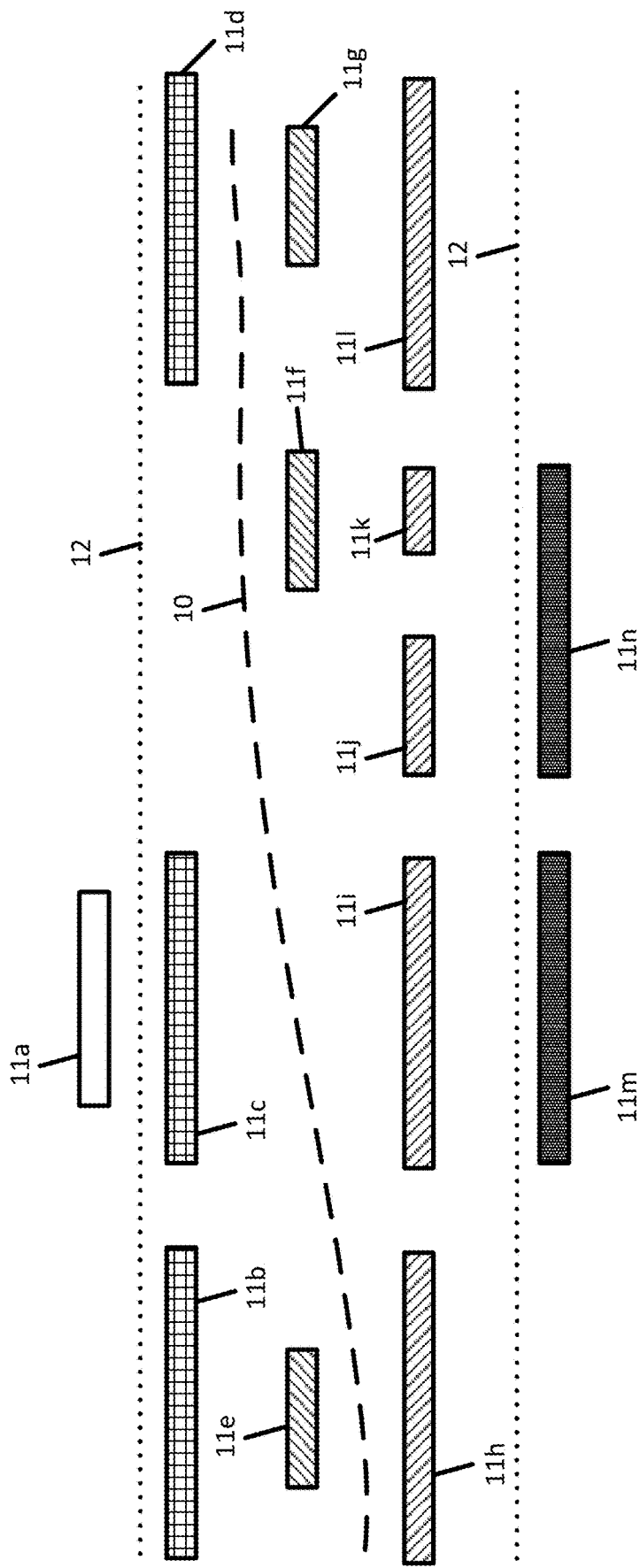
FIG. 10 illustrates lane marking candidate groupings for the roadway of FIG. 9.

FIG. 10 illustrates example lane marking candidate groupings for the roadway of FIG. 9. Five groups are generated and illustrated using different hash marks (e.g., a first group includes lane marking candidate 11a, a second group includes lane marking candidates 11b, c, d, a third group includes lane marking candidates 11e, f, g, a fourth group includes lane marking candidates 11h, I, j, k, l, and a fifth group includes lane marking candidates 11m, n). The lane marking generator 121 may designate groups outside of the road boundaries 12 as outlier groups and may remove such groups from consideration (e.g., deleted from memory).

Figure 11:
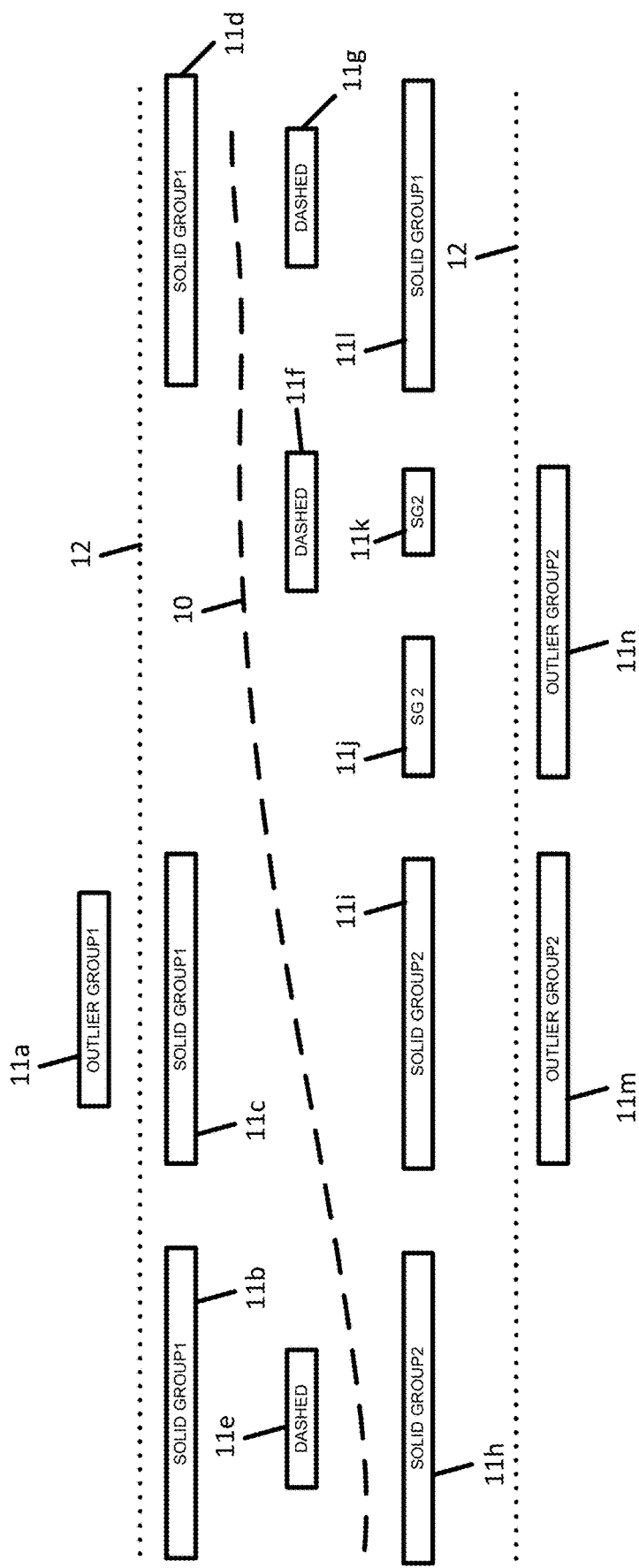
FIG. 11 illustrates the types of the lane marking candidate groupings of FIG. 10.

FIG. 11 illustrates the types of the lane marking candidate groupings of FIG. 10. On a certain portion of the roadway, for each group, the function label is determined by the ratio of the total length of detected line segments belonging to this group to the total length of road that contains this line group. Typically, considering reasonable misdetections and incorrect detections, the length ratio of dashed line is significant lower than the ratio of solid line. In the task of modeling highway roads, there is an assumption that each road portion can have at most two solid lines bounding the (drivable) road surface.

The lane marking generator 121 determines the total length of the chunk and the proportion of the total length covered by the lane marking candidates in a group. The lane marking generator 121 compares this proportion to one or more thresholds. When the proportion is below a minimum threshold, the lane marking candidate group may be removed from consideration (e.g., deleted from memory). When the proportion is above the minimum threshold but below a continuous line threshold, the lane marking generator 121 may classify the lane marking candidate group as a dashed line. When the proportion is above the continuous line threshold, the lane marking generator 121 may classify the lane marking candidate group as a solid line. In one embodiment, the lane marking generator 121 designates a predetermined number of lane marking groups with the highest proportion of the total length covered by the lane marking candidates as solid lane lines. The predetermined number may be two when the number of solid lanes for a roadway or road segment is two. The geographic database 123 may store the number of solid lines, the number of dashed lines, or total number of lines as an attribute associated with individual road segments or strands of road segments.

Figure 12:
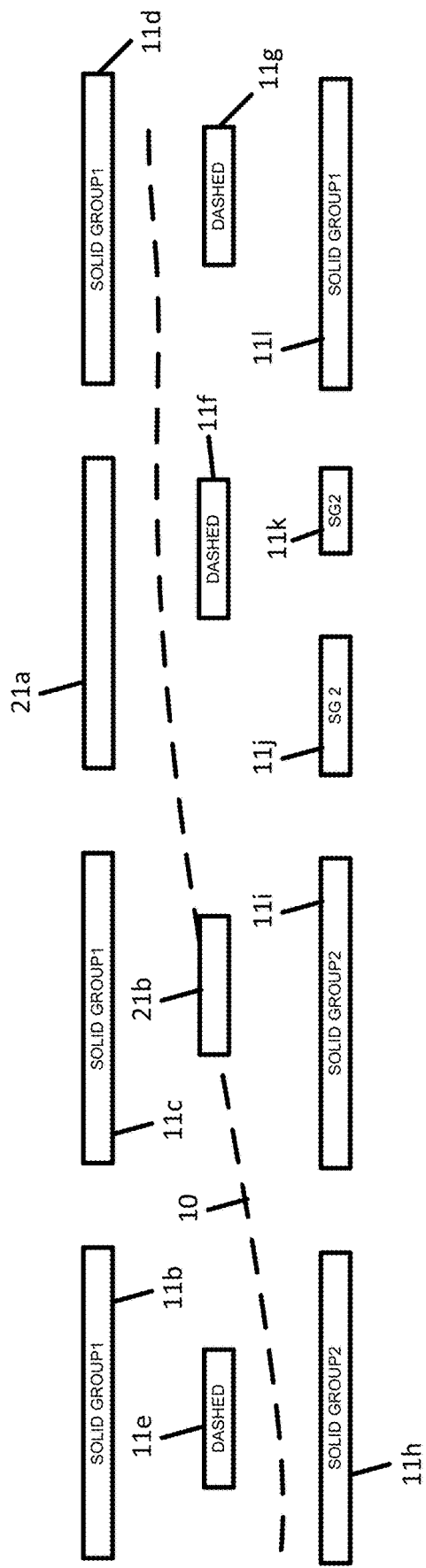
FIG. 12 illustrates interpolated lane marking from the lane marking candidate groupings of FIG. 10.

FIG. 12 illustrates interpolated lane marking from the lane marking candidate groupings of FIG. 10. The lane line generator 11 supplements the lane marking candidate group according to the classification group. For example, solid group1 (markings 11b, c, d) is supplemented to be a continuous line or to include supplemental lane marking 21a. In another example, the entire solid group1 is replaced with a synthetic lane marking of a predetermined size, width, or other dimensions. In another example, dashed group (markings 11e, f, g) is supplemented to be a dashed line by the insertion of supplemental lane marking 21b. In another example, the solid group2 (markings 11h, I, j, k, l) may not be supplemented. Alternatively, solid group2 may be supplemented by replace the incomplete lengths of lane markings 11j, k with a supplemental lane marking. The supplemental or synthetic lane marked are interpolated as a function of the detected lane markings.

In this grouping, classification, and linking procedure, numerous thresholds and constraints (i.e. distance threshold, search range, etc.) may control the process. Generally, these variables may be described generally as either loose (longer search range, wider distance threshold) or tight (shorter search range, narrower distance threshold) to reflect the abstract performance (i.e. geometry performance and function accuracy) of the model, the geometry accuracy increases with the tightness, and function accuracy is opposite. Hence, it is a trade off between function accuracy and geometry accuracy, and the balance point depends on varying road conditions and specific road modeling targets.

In one example, the thresholds and constraints may be determined based on the functional classification of the roadway. In one example, major roadways may be assigned be assigned loose constraints (e.g., lower distance thresholds, longer search range) and minor roadways may be assigned tighter constraints (e.g., higher distance thresholds, shorter search range). The lane line generator 121 may receive user inputs for individual functional classifications for geometry accuracy priority or functional accuracy priority. The lane line generator 121 may receive user inputs for different distance thresholds or search ranges that are applied to the different functional classifications of roadways.

Various functional classification systems may be used. One example of a functional classification maintained by the United States Federal Highway administration. The simple system includes arterial roads, collector roads, and local roads. The functional classifications of roads balance between accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

An example of a complex functional classification system is the urban classification system. Interstates include high speed and controlled access roads that span long distances. The arterial roads are divided into principle arteries and minor arteries according to size. The collector roads are divided into major collectors and minor collectors according to size. Another example functional classification system divides long distance roads by type of road or the entity in control of the highway. The functional classification system includes interstate expressways, federal highways, state highways, local highways, and local access roads. Another functional classification system uses the highway tag system in the Open Street Map (OSM) system. The functional classification includes motorways, trunk roads, primary roads, secondary roads, tertiary roads, and residential roads.

Figure 13:
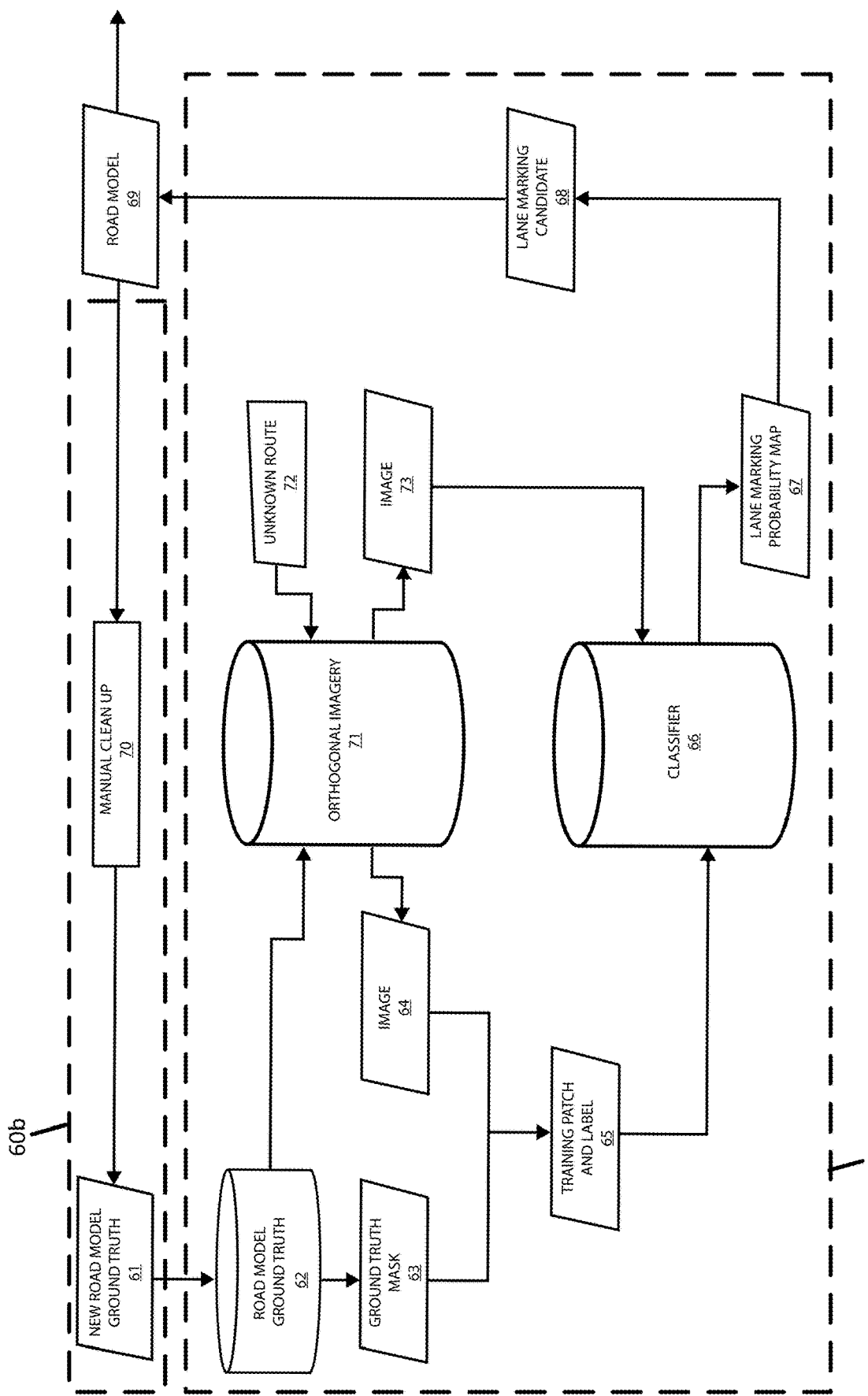
FIG. 13 illustrates a flow chart for road modeling from overhead imagery and feedback for enhanced training.

FIG. 13 illustrates a flow chart for road modeling from overhead imagery and feedback for enhanced training. A first iteration 60*a* includes a road model ground truth database 62, from which a ground truth mask 63 is generated. The road model ground truth database 62 includes the locations of lane markings which may be confirmed or detected by human operators (e.g., surveys performed on the ground, visual inspection of images, etc.) The ground truth mask 63 may include binary vales for pixels or regions indicating whether a lane line is included (e.g., 0 for absence of lane line, 1 for existence of lane line). The orthogonal imagery database 71 is queried using the road model ground truth 62 to select the image 64. The ground truth mask 63 may be the same dimensions as the image 64. The ground truth mask 63 and the image 64 are combined to generate the training patches and labels 65.

As described in embodiments herein, the classifier 66 analyzes subsequent images 63. The subsequent images 73 may be selected from a query of unknown route 72 to the orthogonal imagery database 71. The classifier 66 generates a lane marking probability map 67, and through the grouping and classification algorithms described herein, a lane marking candidate 68. The road model 69 is updated based on the lane marking determinations made from the lane marking candidate 68.

After the first iteration 60*a*, a feedback portion 60*b*, provides feedback to the system to further refine the process for subsequent iterations. The results of the first iteration, in addition to updating the road model 69, are applied back to a manual clean up process 70, which may include one or more ground truth devices and one or more human operators. The clean up process 70 improves upon the automatic detections made in the first iteration 60*a* by removing any false positives or false negatives. The manual clean up process 70 greatly increases the amount of training images, applied aa the new road model ground truth for improvement of the classifier 66 through subsequent training sequences.

Figure 14:
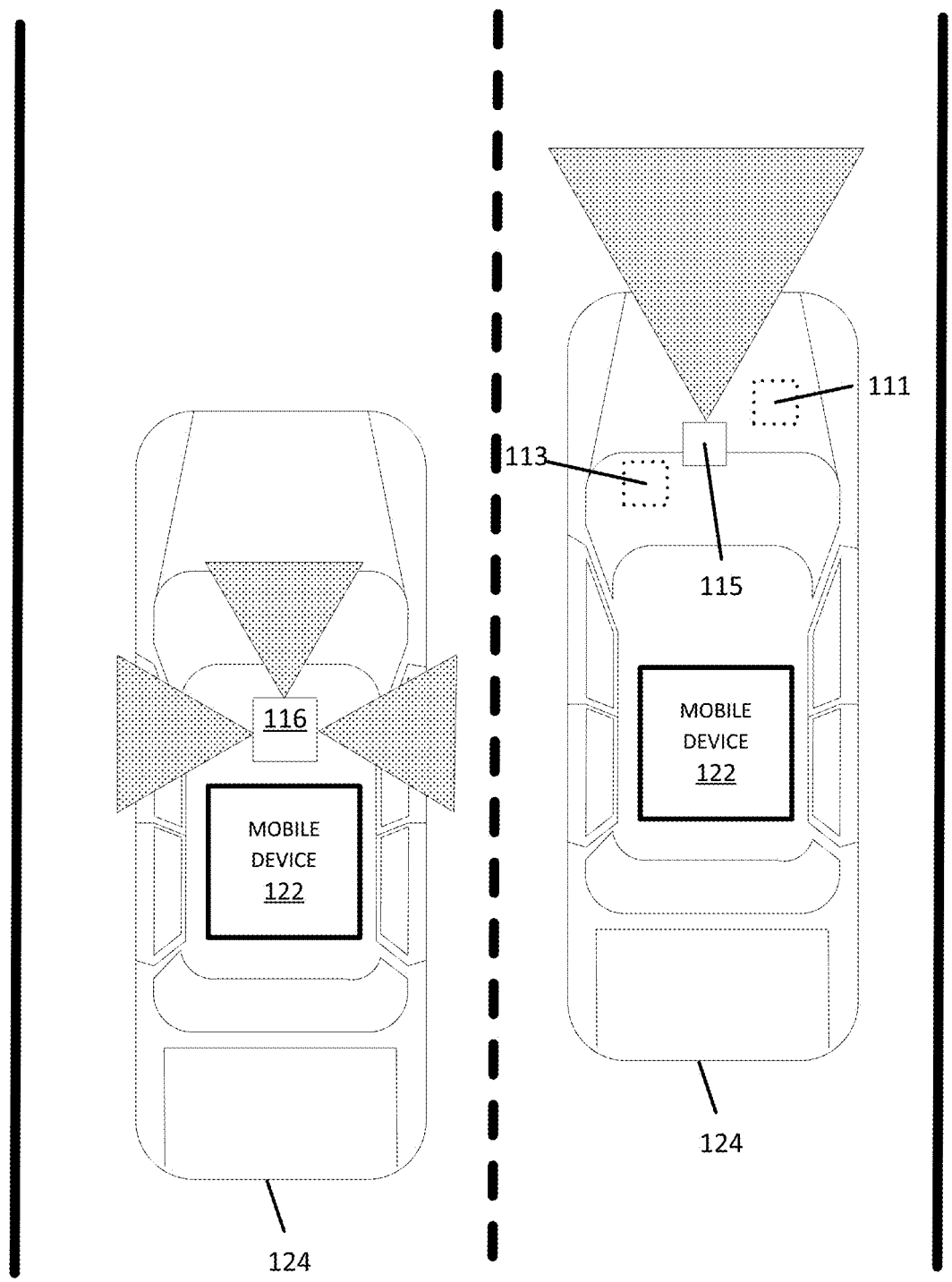
FIG. 14 illustrates example data collection vehicles and/or assisted driving vehicles.

FIG. 14 illustrates example vehicles for collection data for generating geometries for lane line objects. A connected vehicle includes a communication device and an environment sensor array (e.g., corresponding to probe 101) for reporting the surroundings of the vehicle 124 to the server 125. The connected vehicle may include an integrated communication device coupled with an in-dash navigation system. The connected vehicle may include an ad-hoc communication device such as a mobile device or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle. The sensor array may include multiple sensors. Example sensors include an optical distance system such as a LiDAR system 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera. The LiDAR system 116, an image capture system 115 may collect sensor data that describes whether or not the vehicle 124 is traveling in a tunnel, whether or not the sun is shining, whether or not the current weather includes precipitation, or other factors external to the vehicle 124.

The vehicles 124 may include a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122.

In some alternatives, additional sensors may be included in the vehicle 124. An engine sensor 111 may include a throttle sensor that measures a position of a throttle of the engine or a position of an accelerator pedal, a brake sensor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor. The vehicle sensor 113 may include a microphone, an internal camera, or another sensor to detect the internal environment of the vehicle 124. Any vehicle may include any combination of the sensors. The sensors are shown in association with different vehicle for the ease of illustration.

The mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle. The assisted driving device may include memory, a processor, and systems to communicate with the mobile device 122. The assisted driving vehicles may response to geographic data received from geographic database 123 and the server 125, which may have been updated. The mobile device 122 is configured to perform a driving assistance function in response to the lane line objects, or other road objects, detected from the overhead images.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in response to detected objects or objects in the geographic database 123. The objects in the geographic database 123 may include one or more lane line objects or other road objects generated according to the techniques described herein. The autonomous vehicle is configured to generate a driving command in response to the lane line objects, or other road objects, detected from the overhead images.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and/or objects in the geographic database 123. The objects in the geographic database 123 may include the lane line objects detected from the overhead images.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle and/or objects in the geographic database 123. The objects in the geographic database 123 may include one or more lane line objects generated according to the techniques described herein.

Figure 15:
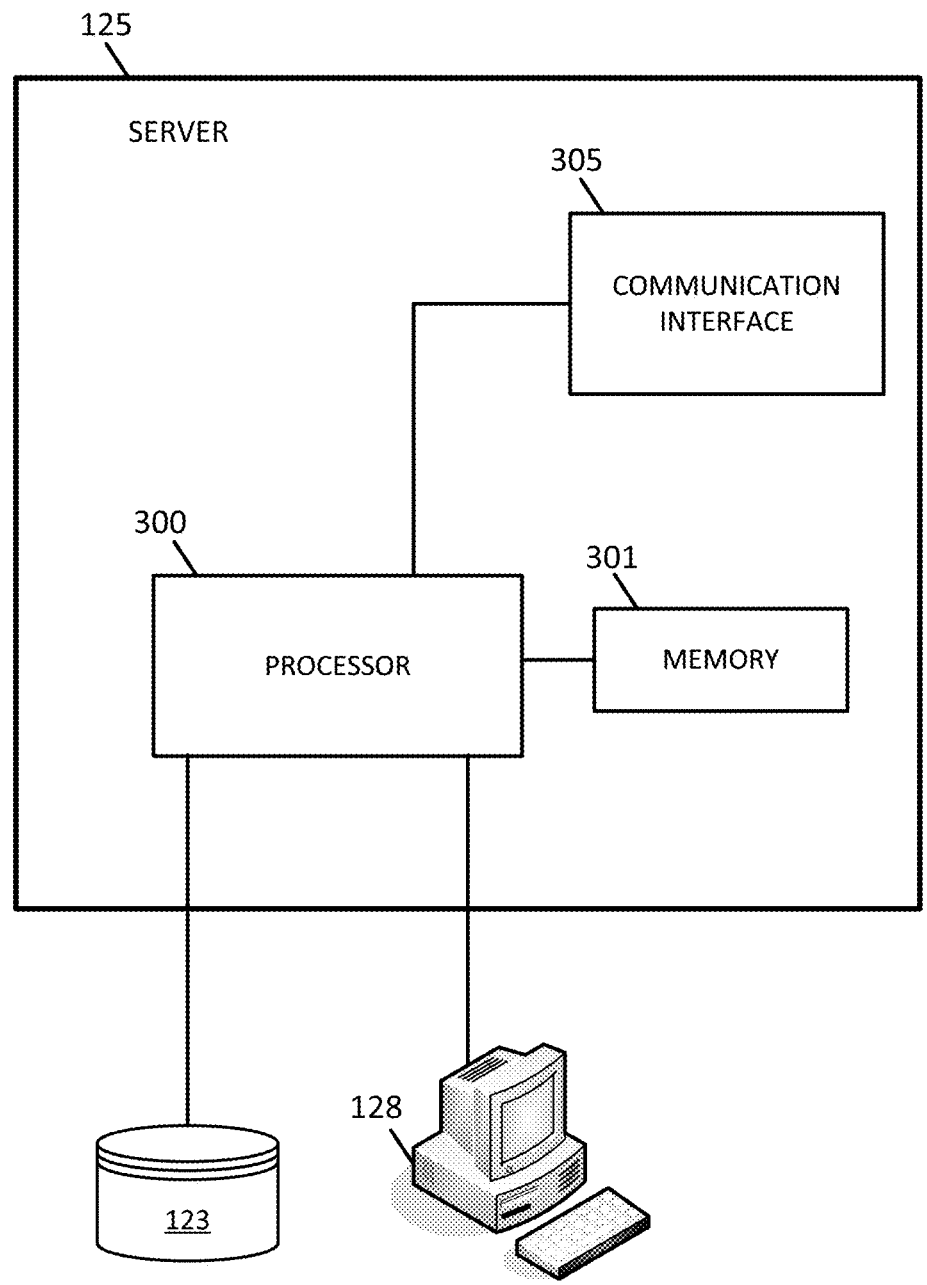
FIG. 15 illustrates an example server.
Figure 16:
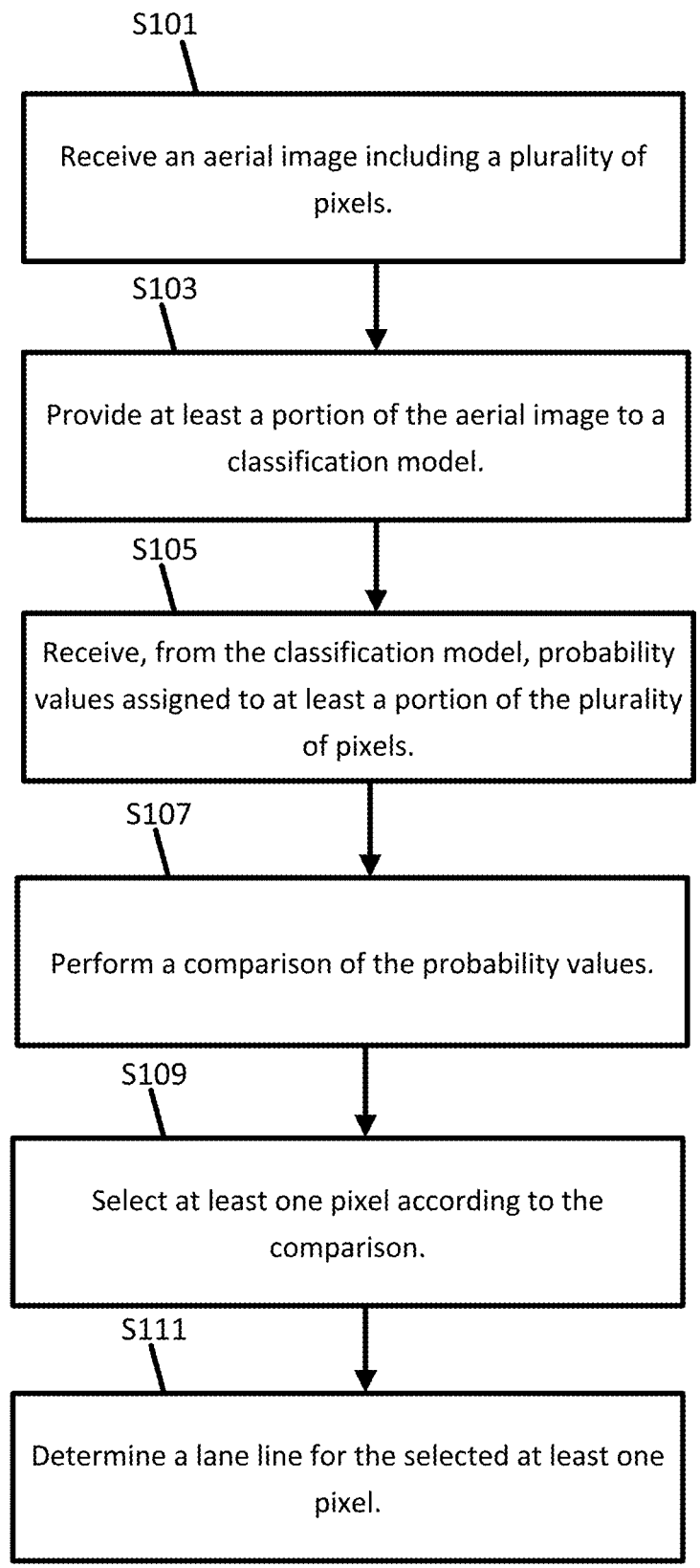
FIG. 16 illustrates an example flowchart for the operation of the server of FIG. 15.

FIG. 15 illustrates an example server 125, which may apply to the system of FIGS. 2A and/or 2B. The server 125 includes a processor 300, a communication interface 305, a memory 301, and a database 123. An input device (e.g., keyboard or personal computer) may be used to enter settings to the server 125. Example classification model settings may include object settings such as the types of lane lines (e.g., dotted, solid, continuous, semi-continuous) or type of road object (e.g., guardrail, barrier, lane line). Example classification model settings may include chunk settings for the size of roadway that is analyzed, threshold levels for the types of lane lines, or template settings for the dimensions of the synthetic object used to complete the detected lane markings. Example deep learning model settings include the type of model (e.g., neural network, classification and regression, or clustering), and/or parameters of the model (e.g., the number of layers and/or type of layers). Example geometry detection settings may include the probability threshold for determining a lane marking exists and/or a confidence level interval for establishing a lane marking line that is fitted to the data points. Additional, different, or fewer components may be provided in the server 125. FIG. 16 illustrates an example flowchart for the operation of server 125. Additional, different, or fewer acts may be provided.

The geographic database 123 includes road segments, and at least one road segment associated with at least one road object attribute. The road object attribute may describe the type of road object (e.g., physical divider, lane line, or another object). The road object attribute may describe a relative location of the road object.

The memory 301 is configured to store received probe data. The memory 301 is configured to store image data collected along the roadway and distance data collected along the roadway.

At act S101, the processor 300 or the communication interface 305 is configured to receive an aerial image including a plurality of pixels depicting a roadway. The aerial image may be collected from a satellite. The pixels may have image characteristics such as pixel values for color, brightness, and size. The communication interface 305 is a means for receiving the aerial image.

At act S103, the processor 300 provides at least a portion of the aerial image to a classification model. The classification model may be defined according to any of the examples herein. The processor 300 may provide the pixel values to the classification model in an order such as according to image coordinates in the image. The classification model may include a deep learning technique based on a set of training images. The training images have known positions of lane lines. Through training, the processor 300 develops a relationship between the pixels values whether the portion of the image in the image processing window includes a lane line. The processor 300 may include circuitry or a module or an application specific controller as a means for providing at least a portion of the aerial image to a classification model.

At act S105, the processor 300 is configured to receive, from the classification model, probability values assigned to at least a portion of the plurality of pixels. The probability values may describe how likely a pixel, or group of pixels, is to be part of a lane marking. The processor 300 includes circuitry or a module or an application specific controller as a means for receiving, from the classification model, probability values assigned to at least a portion of the plurality of pixels.

At act S107, the processor 300 performs a comparison of the probability values. At act S109, the processor 300 selects at least one pixel according to the comparison. The comparison may include identifying one or more local extrema (e.g., local maximum) value. The comparison may involve fitting a line or a curve to the probability values. The curve fitted may describe a normal distribution or another distribution. The processor 300 includes circuitry or a module or an application specific controller as a means for performing a comparison of the probability values and means for selecting at least one pixel according to the comparison.

At act S111, the processor 300 determines a lane line for the selected at least one pixel. The determination may be based on comparing the at least one pixel to a location threshold with respect to a road segment from database 123. The determination may be based on a template of lane marking shapes. The processor 300 includes circuitry or a module or an application specific controller as a means for determining a lane line for the selected at least one pixel.

Figure 17:
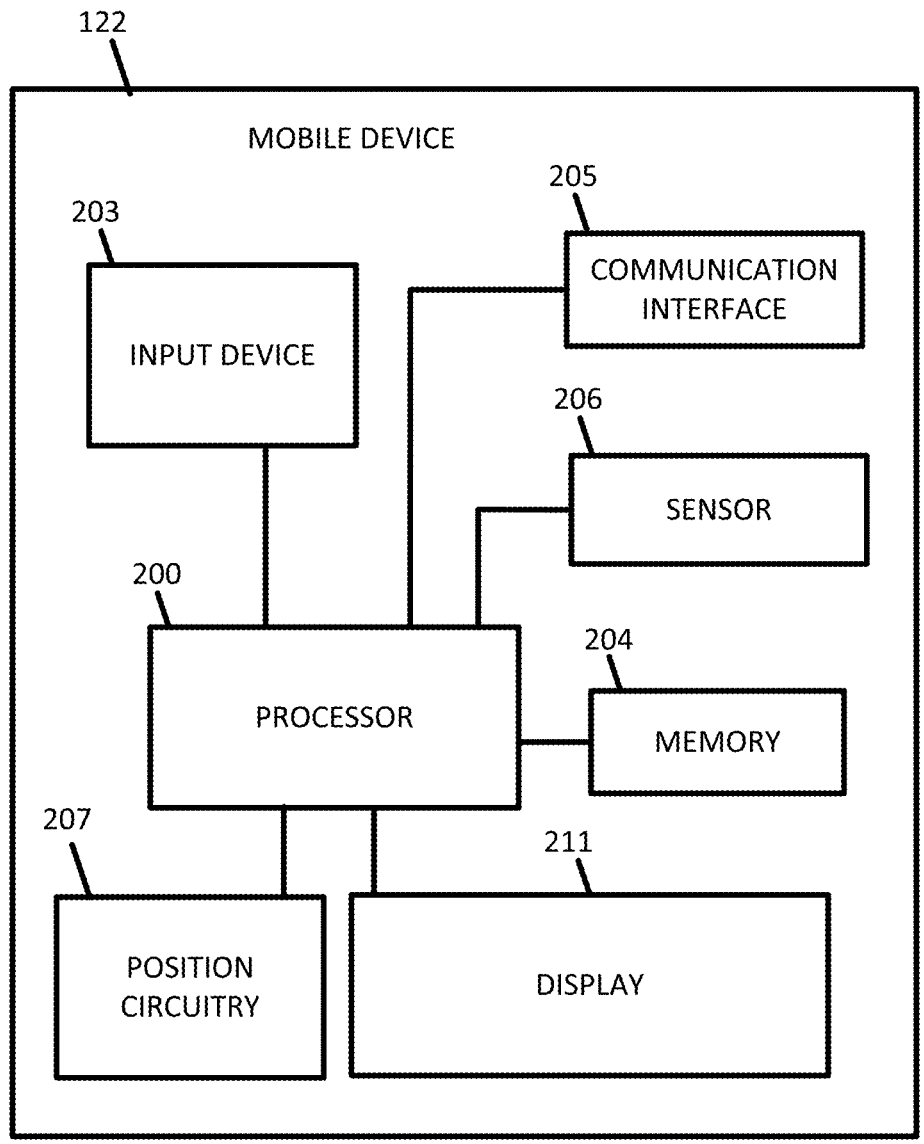
FIG. 17 illustrates an example mobile device.
Figure 18:
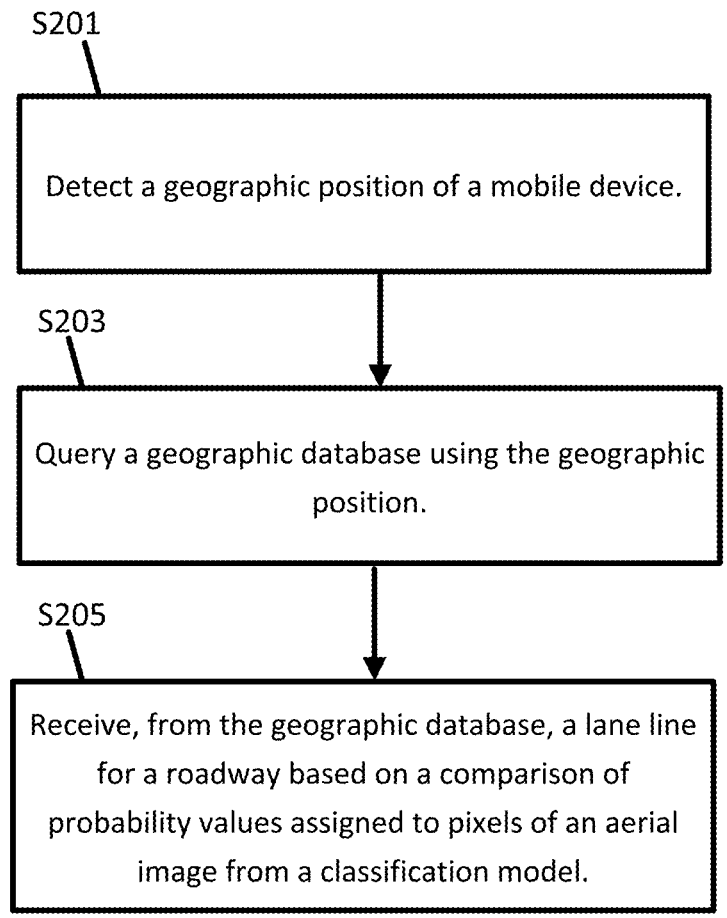
FIG. 18 illustrates an example flowchart for the operation of the mobile device of FIG. 17.

FIG. 17 illustrates an exemplary mobile device 122 of the system of FIGS. 2A and/or 2B. The mobile device 122 includes a processor 200, a vehicle database 123, a memory 204, an input device 203, a communication interface 205, position circuitry 207, a distance detector 209, a display 211, and a sensor 206. The sensor 206 may include a camera, a LiDAR device, or another sensor described herein. Additional, different, or fewer components are possible for the mobile device 122. FIG. 18 illustrates an example flowchart for the operation of mobile device 122. Additional, different, or fewer acts may be provided.

At act S201, the position circuitry 207, or the processor 200 through the position circuitry 207, detects a position of a mobile device 122. The position detector or position circuitry 207 is configured to determine a geographic position associated with the roadway. The position circuitry 207 is means for determining the position of the mobile device 122.

At act S203, the processor 200 queries the geographic database 123 using the geographic position. The processor 200 includes circuitry or a module or an application specific controller as a means for querying a geographic database using the geographic position.

At act S205, the processor 200 receives, from the geographic database 123, a lane line for a roadway. The lane line is based on a comparison of probability values assigned to pixels of an aerial image from a classification model according to any of the examples described herein. The processor 200 includes circuitry or a module or an application specific controller as a means for receiving the lane line object for the roadway from the geographic database 123. The processor 200 and display 211 may render a high definition map include the lane line.

The processor 300 may generate a driving assistance message in response to the received lane line object. The driving assistance message may be presented on display 211. The displayed message may instruct a driver than a lane line has been crossed or at risk of being crossed. The displayed message may instruct the driver to steer the vehicle back to the proper trajectory of the roadway. The driving assistance message may be a driving command for an autonomous driving system. The driving command may be a warning of the location of the lane line object. The driving command may adjust a trajectory or a speed of the vehicle. The driving command may instruct the vehicle to steer left, steer right, or slow down to return the vehicle back to the proper trajectory of the roadway. The processor 200 includes circuitry or a module or an application specific controller as a means for generating the driving assistance message.

The processor 300 may perform positioning or localization in response to the received lane line object. The processor 200 includes circuitry or a module or an application specific controller as a means for performing positioning or localization in response to the received lane line object. The localization may be independent, based solely on the lane line object and/or other road objects. The localization may be dependent on position circuitry 307 (i.e., an initial geographic position is determined by the position circuitry 307 and refined, filtered, or confirmed by the localization from the received lane line object).

The processor 300 may receive probe data (e.g., from sensor 206) describing surroundings of the mobile device 122. The probe data may describe the detected location of road objects. The probe data may include one or more angels and one or more distances from the sensor 206 to the road objects. The processor 300 performs a comparison the lane line object from geographic database 123 to the data indicative of the surrounding of the mobile device 122. The processor 300 may modify a geographic position (e.g., detected by position circuitry 307) based on the comparison.

The mobile device 122 may generate a routing instruction based on the location determined or modified in response to the lane line objects. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The navigation device 122 may then provide the end user with information about the optimum route in the form of guidance that identifies the maneuvers required to be taken by the end user to travel from the origin to the destination location. Some mobile device 122 show detailed maps on display 211 outlining the route, the types of maneuvers to be taken at various locations along the route, locations of certain types of features, and so on, any of which may include the lane line objects for lane marking or roadside objects.

The mobile device 122 may plan a route through a road system, or modify a current route through a road system based on the matched probe data. The route may extend from a current position of the mobile device or an origin to a destination through the road segment matched with the probe data. Possible routes may be calculated based on a Dijkstra method, an A-star algorithm or search, and/or other route exploration or calculation algorithms that may be modified to take into consideration assigned cost values of the underlying road segments. Various other aspects, such as distance, non-navigable areas, and/or restrictions, may be considered in addition to the cost to determine an optimum route.

In FIG. 18, the geographic database 123 may contain at least one road segment database record 304 (also referred to as "entity" or "entry") for each road segment in a particular geographic region. Any of the features of geographic database 123 may be applied to local databases 133. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include other kinds of data 310. The other kinds of data 310 may represent other kinds of geographic features or anything else. The other kinds of data may include point of interest (P01) data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304. As another example, the indexes 314 may relate road object data 308 (road object attributes) with a road segment in the segment data records 304 or a geographic coordinate. An index 314 may, for example, store data relating to one or more locations for the road object attribute 308 for each location. The road object attribute 308 may describe the type of road object (e.g., lane marking, dashed line marking, solid line marking, barrier, guardrail), the relative location of the road object, an angle from the direction of travel to the road object, and/or a distance between the road segment and the road object.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 relevant for this invention are: temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 123 may include historical traffic speed data for one or more road segments. The geographic database 123 may also include traffic attributes for one or more road segments. A traffic attribute may indicate that a road segment has a high probability of traffic congestion.

Figure 19:
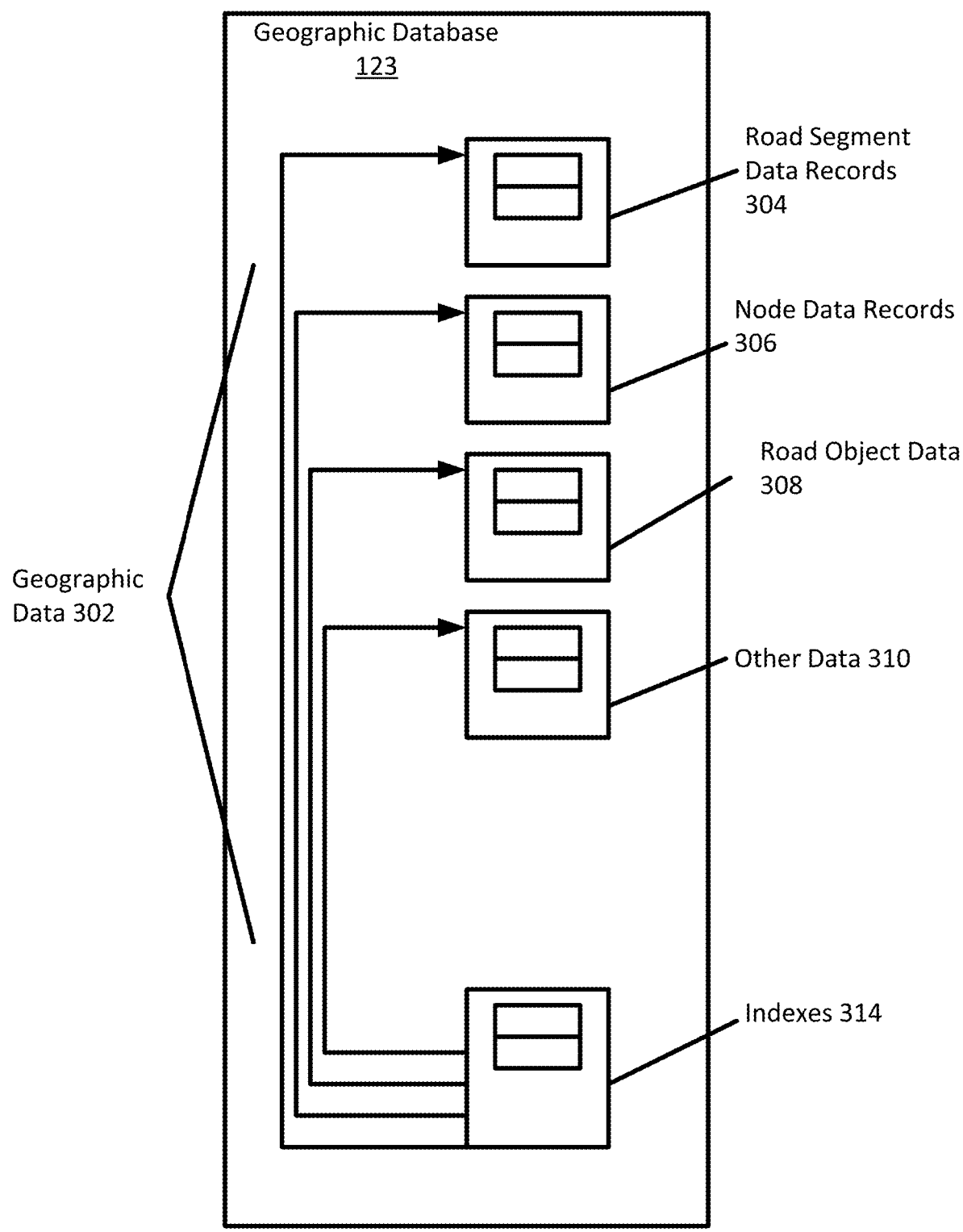
FIG. 19 illustrates an example geographic database.
Figure 20:
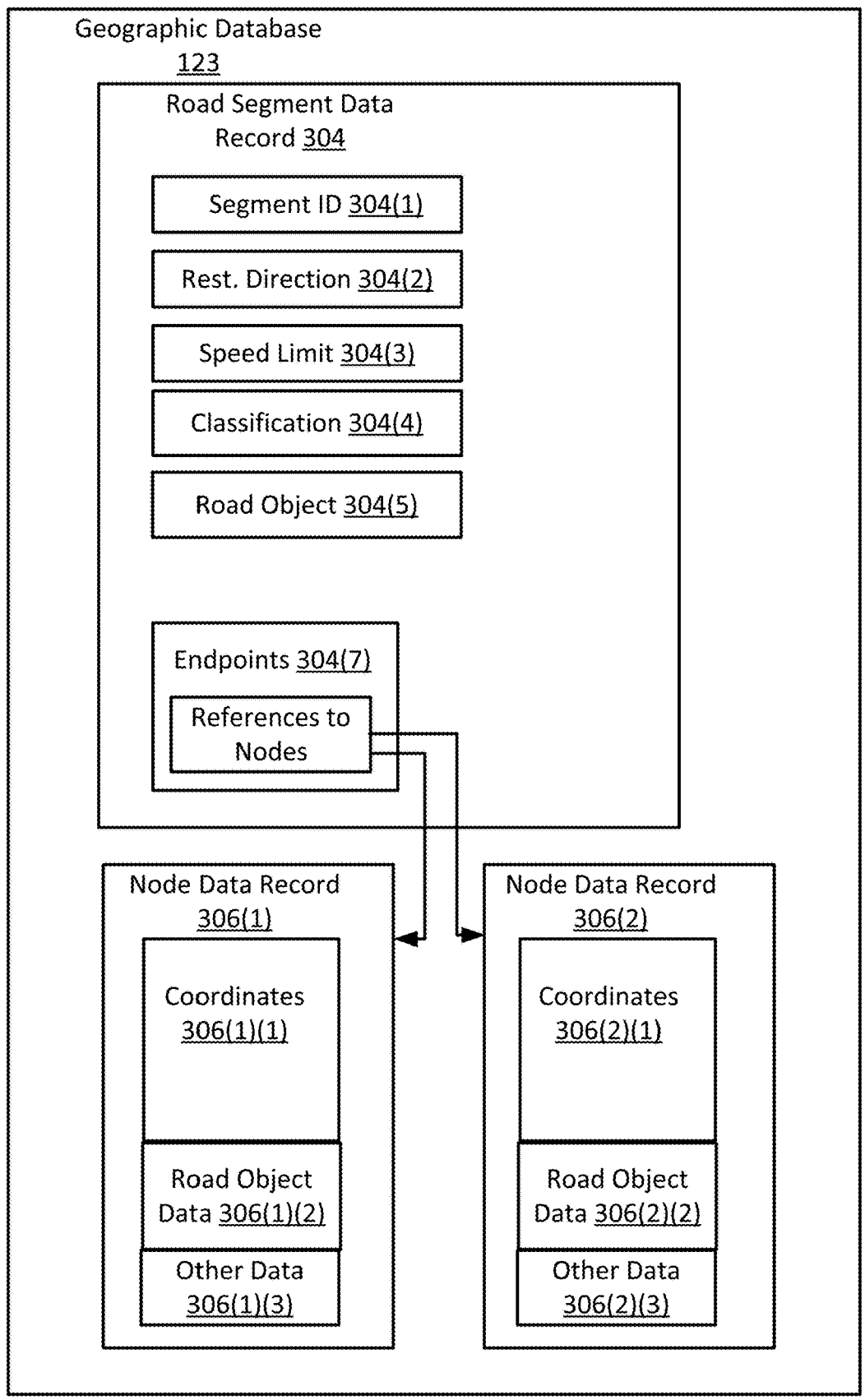
FIG. 20 illustrates an example geographic database.

FIG. 19 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 304 (or data entities) that describe features such as road objects 304(5). The road objects 304(5) may be stored according to location boundaries or vertices. The road objects 304(5) may be stored as a field or record using a scale of values such as from 1 to 100 for type or size. The road objects may be stored using categories such as low, medium, or high. Additional schema may be used to describe the road objects. The attribute data may be stored in relation to a link/segment 304, a node 306, a strand of links, a location fingerprint, an area, or a region. The geographic database 123 may store information or settings for display preferences. The geographic database 123 may be coupled to a display. The display may be configured to display the roadway network and data entities using different colors or schemes. The geographic database 123 may provide different display information relating to where open parking spots may exist, for example.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record, or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 19 also shows some of the components of a node data record 306 that may be contained in the geographic database 123. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node, and road object data 306(1)(2) and 306(2)(2). The node data records 306(1) and 306(2) may also include other data 306(1)(3) and 306(2)(3) that refer to various other attributes of the nodes.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used. The database 123 may be incorporated in or connected to the server 125.

The geographic database 123 and the data stored within the geographic database 123 may be licensed or delivered on-demand. Other navigational services or traffic server providers may access the location fingerprint data, traffic data and/or the lane line object data stored in the geographic database 123.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 800 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The database 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory.

Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory.

Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment to streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1

A method for roadway lane line detection, the method comprising:
receiving an aerial image including a plurality of pixels;
providing, by a processor, at least a portion of the aerial image to a classification model;
receiving, from the classification model, probability values assigned to at least a portion of the plurality of pixels;
performing, by the processor, a comparison of the probability values;
selecting, by the processor, at least one pixel according to the comparison; and
determining, by the processor, a lane line for the selected at least one pixel.

Embodiment 2

The method of embodiment 1, further comprising:
updating a geographic database according to the determined lane line.

Embodiment 3

The method of any of embodiments 1 and 2, wherein a geographic database image stored in the geographic database is updated according to the determined lane line, and the geographic database image has a first spatial resolution greater than a second spatial resolution for the aerial image.

Embodiment 4

The method of any of embodiments 1-3, further comprising:
identifying a geographic location for the selected at least one pixel, wherein the geographic database is updated at the identified geographic location.

Embodiment 5

The method of any of embodiments 1-4, wherein probe data collected at a mobile device is compared to the lane line for localization of the mobile device.

Embodiment 6

The method of any of embodiments 1-5, wherein an assisted driving feature is provided based on the lane line.

Embodiment 7

The method of any of embodiments 1-6, wherein the selected at least one pixel includes multiple pixels overlaid on road boundaries.

Embodiment 8

The method of any of embodiments 1-7, further comprising:
identifying at least one outlier pixel from the plurality of pixels based on a roadway width.

Embodiment 9

The method of any of embodiments 1-8, further comprising:
calculating a lane line groups from the plurality of pixels based on relative distances of the plurality of pixels.

Embodiment 10

The method of any of embodiments 1-9, further comprising:
calculating a coverage proportion for at least one of the lane line groups;
comparing the coverage proportion to a coverage threshold; and
determining a type of lane marking based on the comparison with the coverage threshold.

Embodiment 11

The method of any of embodiments 1-10, wherein the type of lane marking is a solid line or a dash line.

Embodiment 12

An apparatus, configured to perform and/or control the method of any of embodiments 1-11 or comprising means for performing and/or controlling any of embodiments 1-11.

Embodiment 13

An apparatus, comprising at least one processor and at least one memory including computer program code for one or more programs, the at least one memory and the computer program code configured to, with the at least one processor, to perform and/or control the method of any of embodiments 1-11.

Embodiment 14

A computer program comprising instructions operable to cause a processor to perform and/or control the method of any of embodiments 1-11, when the computer program is executed on the processor.

Embodiment 15

A method comprising:
detecting a geographic position of a mobile device;
querying a geographic database using the geographic position; and
receiving, from the geographic database, a lane line object for a roadway, wherein the lane line is based on a comparison of probability values assigned to pixels of an aerial image from a classification model.

Embodiment 16

The method of embodiment 15, further comprising:
rendering a high definition map include the lane line object.

Embodiment 17

The method of any of embodiments 15-16, further comprising:
receiving probe data indicative of surroundings of the mobile device;
performing a comparison the lane line object to the data indicative of the surrounding of the mobile device; and modifying the geographic position based on the comparison.

Embodiment 18

The method of any of embodiments 16-17, further comprising:
generating a driver assistance message in response to lane line object.

Embodiment 19

The method of any of embodiments 15-18, further comprising:
generating a driving command for a vehicle in response to the lane line object.

Embodiment 20

The method of any of embodiments 15-19, wherein the driving command is a warning of the location of the lane line object.

Embodiment 21

The method of any of embodiments 15-20, wherein the driving command adjusts a trajectory or a speed of the vehicle.

We claim:

1. A method for roadway lane line detection, the method comprising:
receiving an aerial image including a plurality of pixels;
providing, by a processor, at least a portion of the aerial image to a classification model;
receiving, from the classification model, probability values assigned to at least a portion of the plurality of pixels;
performing, by the processor, a comparison of the probability values assigned to at least the portion of the plurality of pixels;
selecting, by the processor, at least one pixel according to the comparison;
determining, by the processor, a lane line for the selected at least one pixel;
updating a geographic database according to the determined lane line; and
identifying a geographic location for the selected at least one pixel, wherein the geographic database is updated at the identified geographic location.

2. The method of claim 1, wherein a geographic database image stored in the geographic database is updated according to the determined lane line, and the geographic database image has a first spatial resolution greater than a second spatial resolution for the aerial image.

3. The method of claim 1, wherein probe data collected at a mobile device is compared to the lane line for localization of the mobile device.

4. The method of claim 1, wherein an assisted driving feature is provided based on the lane line.

5. The method of claim 1, wherein the selected at least one pixel includes multiple pixels overlaid on road boundaries.

6. The method of claim 1, further comprising:
identifying at least one outlier pixel from the plurality of pixels based on a roadway width.

7. The method of claim 1, further comprising:
calculating a lane line groups from the plurality of pixels based on relative distances of the plurality of pixels.

8. The method of claim 7, further comprising:
calculating a coverage proportion for at least one of the lane line groups;
comparing the coverage proportion to a coverage threshold; and
determining a type of lane marking based on the comparison with the coverage threshold.

9. The method of claim 8, wherein the type of lane marking is a solid line or a dash line.

10. An apparatus for roadway lane line detection, the apparatus comprising:
a memory configured to store an aerial image including a plurality of pixels;
a processor configured to analyze at least a portion of the aerial image and calculate probability values assigned to at least a portion of the plurality of pixels, wherein a lane line is defined according to the probability values assigned to at least the portion of the plurality of pixels; and
a geographic database updated according to the lane line, wherein a geographic location for the portion of the plurality of pixels is identified, and the geographic database is updated at the identified geographic location.

11. The apparatus of claim 10, wherein a geographic database image stored in the geographic database is updated according to the lane line, and the geographic database image has a first spatial resolution greater than a second spatial resolution for the aerial image.

12. The apparatus of claim 10, wherein probe data collected at a mobile device is compared to the lane line for localization of the mobile device.

13. The apparatus of claim 10, wherein an assisted driving feature is provided based on the lane line.

14. The apparatus of claim 10, wherein the portion of the plurality of pixels includes multiple pixels overlaid on road boundaries.

15. The apparatus of claim 10, wherein the classification device is configured to identify at least one outlier pixel from the plurality of pixels based on a roadway width.

16. The apparatus of claim 10, wherein the classification device is configured to calculate a lane line group from the plurality of pixels based on relative distances of the plurality of pixels, and the classification device is configured to calculate a coverage proportion for at least one of the lane line groups, compare the coverage proportion to a coverage threshold, and determine a type of lane marking based on the comparison with the coverage threshold.

17. A non-transitory computer readable medium including instructions that, when executed by a processor, are configured to perform:
receiving an aerial image including a plurality of pixels;
providing at least a portion of the aerial image to a classification model;
receiving, from the classification model, probability values assigned to at least a portion of the plurality of pixels;
performing a comparison of the probability values assigned to at least the portion of the plurality of pixels;
selecting at least one pixel according to the comparison;
determining a lane line for the selected at least one pixel;
updating a geographic database according to the determined lane line; and
identifying a geographic location for the selected at least one pixel, wherein the geographic database is updated at the identified geographic location.

* * * * *